US012719622B2

(12) United States Patent
Takeda et al.

(10) Patent No.: US 12,719,622 B2
(45) Date of Patent: Aug. 25, 2026

(54) OVERLAPPING DOWNLINK CONTROL CHANNEL AND CELL-SPECIFIC REFERENCE SIGNAL BANDWIDTHS

(71) Applicant: QUALCOMM Incorporated, San Diego, CA (US)

(72) Inventors: Kazuki Takeda, Minato-ku (JP); Jae Ho Ryu, San Diego, CA (US); Heechoon Lee, San Diego, CA (US)

( * ) Notice: Subject to any disclaimer, the term of this patent is extended or adjusted under 35 U.S.C. 154(b) by 561 days.

(21) Appl. No.: 18/331,582

(22) Filed: Jun. 8, 2023

(65) Prior Publication Data

US 2023/0403106 A1 Dec. 14, 2023

Related U.S. Application Data

(60) Provisional application No. 63/351,704, filed on Jun. 13, 2022.

(51) Int. Cl.
*H04L 5/00* (2006.01)
*H04W 72/232* (2023.01)

(52) U.S. Cl.
CPC .......... *H04L 5/0005* (2013.01); *H04L 5/0051* (2013.01); *H04W 72/232* (2023.01)

(58) Field of Classification Search
CPC ... H04L 5/0005; H04L 5/0051; H04L 5/0048; H04L 5/0053; H04W 72/232
USPC .......................................................... 370/330
See application file for complete search history.

(56) References Cited

U.S. PATENT DOCUMENTS

2013/0003639 A1* 1/2013 Noh ...................... H04L 5/0094 370/312
2020/0053758 A1 2/2020 Hosseini et al.
2023/0337231 A1* 10/2023 Bae ...................... H04L 1/0072
2024/0364471 A1* 10/2024 Liu ...................... H04L 5/0048
2025/0280424 A1* 9/2025 Sun ...................... H04L 5/0051

FOREIGN PATENT DOCUMENTS

EP 3681115 A1 * 7/2020 ......... H04L 27/2602

OTHER PUBLICATIONS

International Search Report and Written Opinion—PCT/US2023/068195—ISA/EPO—Oct. 9, 2023.

* cited by examiner

*Primary Examiner* — Rownak Islam

(57) ABSTRACT

Methods, systems, and devices for wireless communications are described. A user equipment (UE) receives a physical downlink control channel (PDCCH) configuration associated with a first radio access technology (RAT), the PDCCH configuration for a first set of time-frequency resources including one or more control channel elements (CCEs). The UE receives a cell-specific reference signal (CRS) configuration associated with a second RAT, the CRS configuration for a second set of time-frequency resources that overlaps with at least one CCE. The UE receives a demodulation reference signal (DMRS) within a third set of time-frequency resources of a PDCCH in accordance with a DMRS configuration that is identified for the third set of time-frequency resources based on the PDCCH configuration and the CRS configuration, the third set of time-frequency resources included within the one or more CCEs of the first set of time-frequency resources exclusive of the second set of time-frequency resources.

24 Claims, 19 Drawing Sheets

Receive first control signaling indicating a downlink control channel configuration associated with a first radio access technology, the downlink control channel configuration for a first set of time-frequency resources comprising one or more control channel elements

1705

Receive second control signaling indicating a cell-specific reference signal configuration associated with a second radio access technology, the cell-specific reference signal configuration for a second set of time-frequency resources that at least partially overlaps with at least one control channel element of the one or more control channel elements

1710

Receive a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources

1715

1700

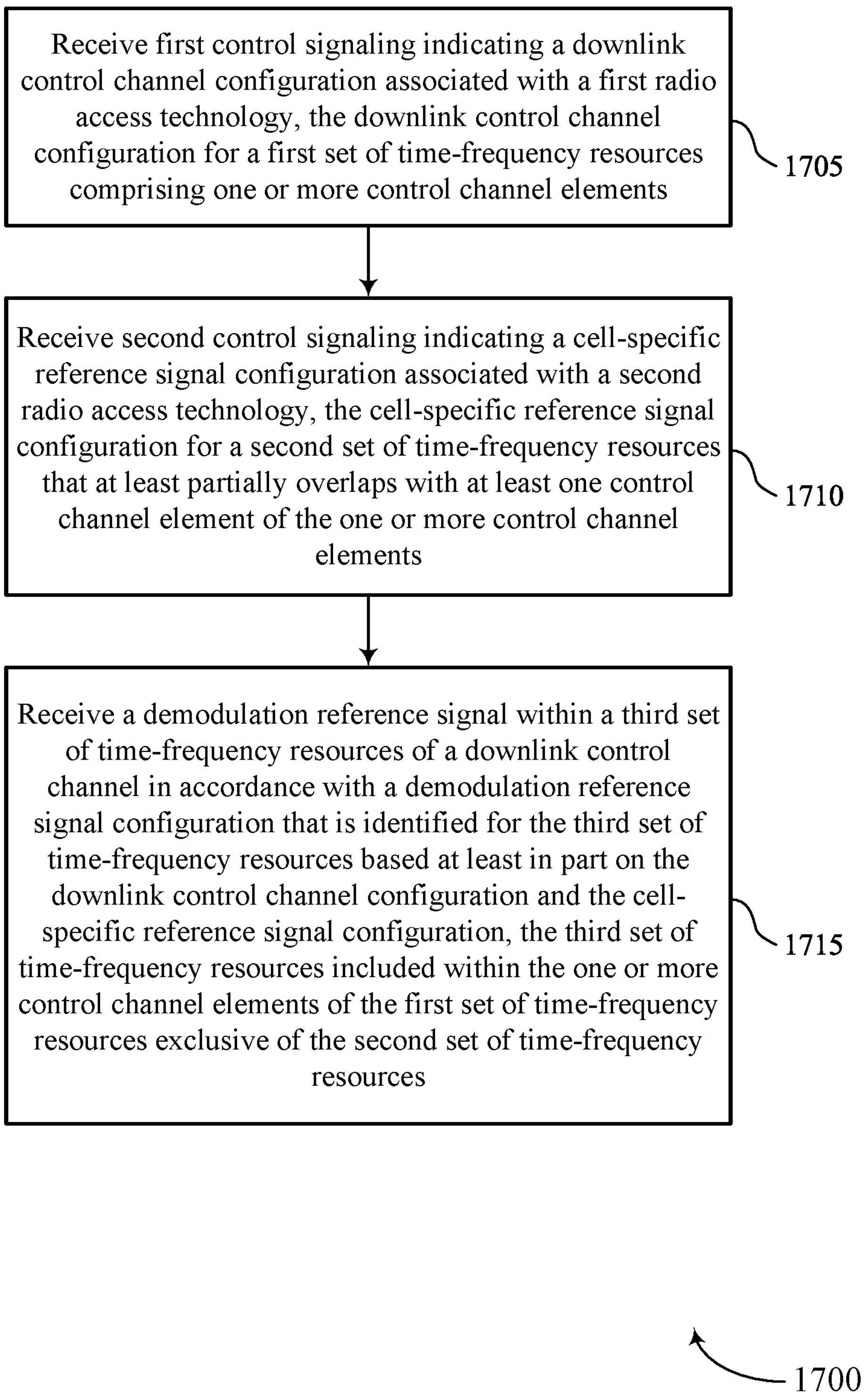

FIG. 17

Transmit, to a UE, first control signaling indicating a downlink control channel configuration associated with a first radio access technology, the downlink control channel configuration for a first set of time-frequency resources comprising one or more control channel elements

1905

Transmit, to the UE, second control signaling indicating a cell-specific reference signal configuration associated with a second radio access technology, the cell-specific reference signal configuration for a second set of time-frequency resources that at least partially overlaps with at least one control channel element of the one or more control channel elements

1910

Transmit, to the UE, a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources

1915

1900

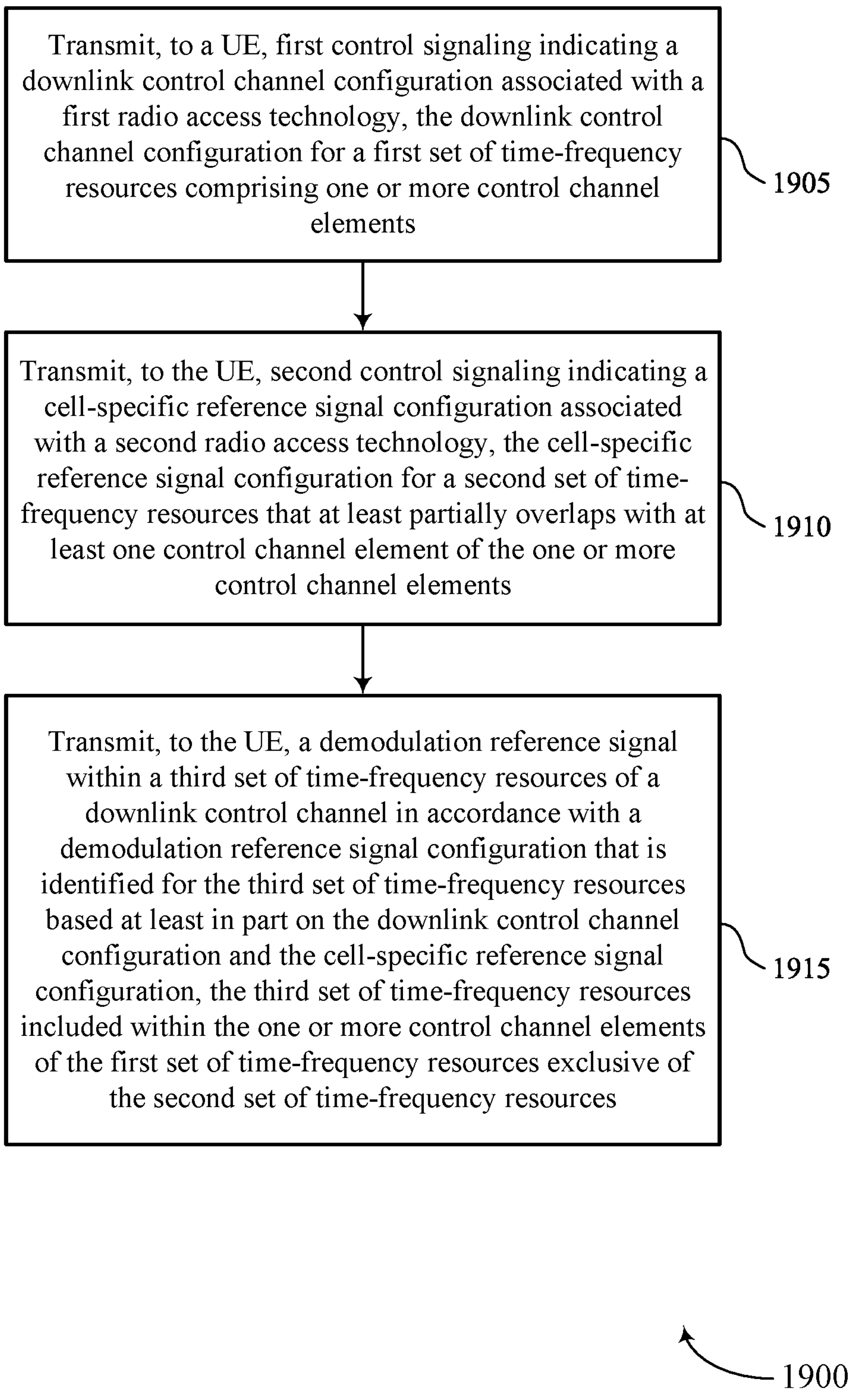

FIG. 19

OVERLAPPING DOWNLINK CONTROL CHANNEL AND CELL-SPECIFIC REFERENCE SIGNAL BANDWIDTHS

CROSS REFERENCE

The present Application for Patent claims the benefit of U.S. Provisional Patent Application No. 63/351,704 by TAKEDA et al., entitled "OVERLAPPING DOWNLINK CONTROL CHANNEL AND CELL-SPECIFIC REFERENCE SIGNAL BANDWIDTHS," filed Jun. 13, 2022, assigned to the assignee hereof, and expressly incorporated by reference herein.

FIELD OF TECHNOLOGY

The following relates to wireless communications, including overlapping downlink control channel and cell-specific reference signal (CRS) bandwidths.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Different radio access technologies (RATs), such as 5G, NR, 4G, and LTE, utilize different sets of resources to communicate different types of signals. In some cases, resources for different RATs may overlap with one another, thereby resulting in conflicts that restrict the ability of wireless devices to perform different types of signals.

SUMMARY

The described techniques relate to improved methods, systems, devices, and apparatuses that support overlapping downlink control channel and cell-specific reference signal (CRS) bandwidths. Generally, aspects of the present disclosure support different rules or configurations that enable demodulation reference signals (DMRSs) to be transmitted within physical downlink control channel (PDCCH) resources associated with a first radio access technology (RAT) when cell-specific reference signal (CRS) resources associated with a second RAT overlap with (e.g., puncture) the PDCCH resources. In particular, aspects of the present disclosure support different DMRS configurations/patterns that enable DMRSs to be communicated on PDCCH resources of a first RAT (e.g., Fifth Generation (5G) or New Radio (NR)) that do not overlap with CRS resources of a second RAT (e.g., Fourth Generation (4G) or Long Term Evolution (LTE)). For example, a user equipment (UE) may receive a PDCCH configuration including multiple control channel elements (CCEs) associated with a first RAT (e.g., 5G, NR), and a CRS configuration associated with a second RAT (e.g., 4G, LTE) that at least partially overlaps with one of the CCEs. In this example, the UE may determine a DMRS configuration within the CCEs based on the PDCCH configuration and the CRS configuration, and may receive a DMRS within the CCEs of the PDCCH resources based on the determined DMRS configuration.

A method for wireless communication at a UE is described. The method may include receiving first control signaling indicating a downlink control channel configuration associated with a first RAT, the downlink control channel configuration for a first set of time-frequency resources including one or more CCEs, receiving second control signaling indicating a CRS configuration associated with a second RAT, the CRS configuration for a second set of time-frequency resources that at least partially overlaps with at least one CCE of the one or more CCEs, and receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

An apparatus for wireless communication at a UE is described. The apparatus may include a processor, memory coupled with the processor, and instructions stored in the memory. The instructions may be executable by the processor to cause the apparatus to receive first control signaling indicating a downlink control channel configuration associated with a first RAT, the downlink control channel configuration for a first set of time-frequency resources including one or more CCEs, receive second control signaling indicating a CRS configuration associated with a second RAT, the CRS configuration for a second set of time-frequency resources that at least partially overlaps with at least one CCE of the one or more CCEs, and receive a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

Another apparatus for wireless communication at a UE is described. The apparatus may include means for receiving first control signaling indicating a downlink control channel configuration associated with a first RAT, the downlink control channel configuration for a first set of time-frequency resources including one or more CCEs, means for receiving second control signaling indicating a CRS configuration associated with a second RAT, the CRS configuration for a second set of time-frequency resources that at least partially overlaps with at least one CCE of the one or more CCEs, and means for receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

A non-transitory computer-readable medium storing code for wireless communication at a UE is described. The code may include instructions executable by a processor to receive first control signaling indicating a downlink control channel configuration associated with a first RAT, the downlink control channel configuration for a first set of time-frequency resources including one or more CCEs, receive second control signaling indicating a CRS configuration associated with a second RAT, the CRS configuration for a second set of time-frequency resources that at least partially overlaps with at least one CCE of the one or more CCEs, and receive a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

In some examples of the method, apparatuses, and non-transitory computer-readable medium described herein, the one or more CCEs span at least a first symbol period and a second symbol period, the second set of time-frequency resources of the CRS configuration at least partially overlaps with a first portion of the one or more CCEs within the first symbol period, and the third set of time-frequency resources include a second portion of the one or more CCEs within the second symbol period.

In some examples of the method, apparatuses, and non-transitory computer-readable medium described herein, the third set of time-frequency resources includes each time-frequency resource of the one or more CCEs within the second symbol period and excludes each time-frequency resource of the one or more CCEs within the first symbol period based on the second set of time-frequency resources of the CRS configuration overlapping with at least a portion of at least one CCE within the first symbol period.

In some examples of the method, apparatuses, and non-transitory computer-readable medium described herein, the one or more CCEs include a first CCE and a second CCE that span at least a first symbol period and a second symbol period, the second set of time-frequency resources of the CRS configuration at least partially overlaps with a first portion of the first CCE in the first symbol period, and the third set of time-frequency resources include the second CCE and a second portion of the first CCE within the second symbol period.

In some examples of the method, apparatuses, and non-transitory computer-readable medium described herein, the one or more CCEs include a CCE including a first resource element group (REG) bundle and a second REG bundle that span at least a first symbol period and a second symbol period, the second set of time-frequency resources of the CRS configuration at least partially overlaps with a first portion of the first REG bundle in the first symbol period, and the third set of time-frequency resources include the second REG bundle and a second portion of the first REG bundle within the second symbol period.

In some examples of the method, apparatuses, and non-transitory computer-readable medium described herein, the second set of time-frequency resources of the CRS configuration overlaps with a first subset of the first portion of the first REG bundle in the first symbol period and the third set of time-frequency resources further include a second subset of the first portion of the first REG bundle in the first symbol period.

Some examples of the method, apparatuses, and non-transitory computer-readable medium described herein may further include operations, features, means, or instructions for processing signals received within the one or more CCEs, where the one or more CCEs include a first set of CCEs of a first type and a second set of CCEs of a second type, where the first set of CCEs of the first type at least partially overlaps with the second set of time-frequency resources of the CRS configuration, and where the second set of CCEs of the second type does not overlap with the second set of time-frequency resources of the CRS configuration, where receiving the DMRS may be based on the processing.

Some examples of the method, apparatuses, and non-transitory computer-readable medium described herein may further include operations, features, means, or instructions for processing the signals received within a quantity of CCEs of the one or more CCEs within a monitoring occasion, a slot, or both, where the quantity of CCEs may be less than or equal to a threshold quantity of CCEs of the first type and the second type that may be capable of being processed by the UE.

Some examples of the method, apparatuses, and non-transitory computer-readable medium described herein may further include operations, features, means, or instructions for processing the signals received within a first quantity of CCEs of the one or more CCEs within a monitoring occasion, a slot, or both, where the first quantity of CCEs may be less than or equal to a first threshold quantity of CCEs of the first type that may be capable of being processed by the UE and processing the signals received within a second quantity of CCEs of the one or more CCEs within the monitoring occasion, the slot, or both, where the second quantity of CCEs may be less than or equal to a second threshold quantity of CCEs of the second type that may be capable of being processed by the UE.

Some examples of the method, apparatuses, and non-transitory computer-readable medium described herein may further include operations, features, means, or instructions for processing signals received within the one or more CCEs, where the one or more CCEs include a first set of CCEs of a first type, a second set of CCEs of a second type, and a third set of CCEs of a third type, where the first set of CCEs of the first type may have a first level of overlap with the second set of time-frequency resources of the CRS configuration, where the second set of CCEs of the second type may have a second level of overlap with the second set of time-frequency resources of the CRS configuration, and where the third set of CCEs of the third type do not overlap with the second set of time-frequency resources of the CRS configuration, where receiving the DMRS may be based on the processing.

In some examples of the method, apparatuses, and non-transitory computer-readable medium described herein, processing the signals may include operations, features, means, or instructions for processing the signals received within a quantity of CCEs of the one or more CCEs within a monitoring occasion, a slot, or both, where the quantity of CCEs may be less than or equal to a threshold quantity of CCEs of the first type, the second type, and the third type that may be capable of being processed by the UE.

In some examples of the method, apparatuses, and non-transitory computer-readable medium described herein, processing the signals may include operations, features, means, or instructions for processing the signals received within a first quantity of CCEs of the one or more CCEs within a monitoring occasion, a slot, or both, where the first quantity of CCEs may be less than or equal to a first threshold quantity of CCEs of the first type that may be capable of being processed by the UE, processing the signals received within a second quantity of CCEs of the one or more CCEs within the monitoring occasion, the slot, or both, where the second quantity of CCEs may be less than or equal to a second threshold quantity of CCEs of the second type that may be capable of being processed by the UE, and processing the signals received within a third quantity of CCEs of the one or more CCEs within the monitoring occasion, the slot, or both, where the third quantity of CCEs may be less than or equal to a third threshold quantity of CCEs of the third type that may be capable of being processed by the UE.

In some examples of the method, apparatuses, and non-transitory computer-readable medium described herein, processing the signals may include operations, features, means, or instructions for processing the signals received within a first quantity of CCEs of the one or more CCEs within a monitoring occasion, a slot, or both, where the first quantity of CCEs may be less than or equal to a first threshold quantity of CCEs of the first type and the second type that may be capable of being processed by the UE and processing the signals received within a second quantity of CCEs of the one or more CCEs within the monitoring occasion, the slot, or both, where the second quantity of CCEs may be less than or equal to a second threshold quantity of CCEs of the second type that may be capable of being processed by the UE.

Some examples of the method, apparatuses, and non-transitory computer-readable medium described herein may further include operations, features, means, or instructions for receiving a downlink control message within a portion of the first set of time-frequency resources exclusive of the second set of time-frequency resources and the third set of time-frequency resources.

In some examples of the method, apparatuses, and non-transitory computer-readable medium described herein, the first RAT includes a 5G RAT, an NR access technology, or any combination thereof, and the second RAT includes a 4G RAT, an LTE RAT, or any combination thereof.

A method for wireless communication at a UE is described. The method may include transmitting, to a UE, first control signaling indicating a downlink control channel configuration associated with a first RAT, the downlink control channel configuration for a first set of time-frequency resources including one or more CCEs, transmitting, to the UE, second control signaling indicating a CRS configuration associated with a second RAT, the CRS configuration for a second set of time-frequency resources that at least partially overlaps with at least one CCE of the one or more CCEs, and transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

An apparatus for wireless communication at a UE is described. The apparatus may include a processor, memory coupled with the processor, and instructions stored in the memory. The instructions may be executable by the processor to cause the apparatus to transmit, to a UE, first control signaling indicating a downlink control channel configuration associated with a first RAT, the downlink control channel configuration for a first set of time-frequency resources including one or more CCEs, transmit, to the UE, second control signaling indicating a CRS configuration associated with a second RAT, the CRS configuration for a second set of time-frequency resources that at least partially overlaps with at least one CCE of the one or more CCEs, and transmit, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

Another apparatus for wireless communication at a UE is described. The apparatus may include means for transmitting, to a UE, first control signaling indicating a downlink control channel configuration associated with a first RAT, the downlink control channel configuration for a first set of time-frequency resources including one or more CCEs, means for transmitting, to the UE, second control signaling indicating a CRS configuration associated with a second RAT, the CRS configuration for a second set of time-frequency resources that at least partially overlaps with at least one CCE of the one or more CCEs, and means for transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

A non-transitory computer-readable medium storing code for wireless communication at a UE is described. The code may include instructions executable by a processor to transmit, to a UE, first control signaling indicating a downlink control channel configuration associated with a first RAT, the downlink control channel configuration for a first set of time-frequency resources including one or more CCEs, transmit, to the UE, second control signaling indicating a CRS configuration associated with a second RAT, the CRS configuration for a second set of time-frequency resources that at least partially overlaps with at least one CCE of the one or more CCEs, and transmit, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

In some examples of the method, apparatuses, and non-transitory computer-readable medium described herein, the one or more CCEs span at least a first symbol period and a second symbol period, the second set of time-frequency resources of the CRS configuration at least partially overlaps with a first portion of the one or more CCEs within the first symbol period, and the third set of time-frequency resources include a second portion of the one or more CCEs within the second symbol period.

In some examples of the method, apparatuses, and non-transitory computer-readable medium described herein, the third set of time-frequency resources includes each time-frequency resource of the one or more CCEs within the second symbol period and excludes each time-frequency resource of the one or more CCEs within the first symbol period based on the second set of time-frequency resources of the CRS configuration overlapping with at least a portion of at least one CCE within the first symbol period.

In some examples of the method, apparatuses, and non-transitory computer-readable medium described herein, the one or more CCEs include a first CCE and a second CCE that span at least a first symbol period and a second symbol period, the second set of time-frequency resources of the CRS configuration at least partially overlaps with a first portion of the first CCE in the first symbol period, and the third set of time-frequency resources include the second CCE and a second portion of the first CCE within the second symbol period.

In some examples of the method, apparatuses, and non-transitory computer-readable medium described herein, the one or more CCEs include a CCE including a first REG bundle and a second REG bundle that span at least a first symbol period and a second symbol period, the second set of time-frequency resources of the CRS configuration at least partially overlaps with a first portion of the first REG bundle in the first symbol period, and the third set of time-frequency resources include the second REG bundle and a second portion of the first REG bundle within the second symbol period.

In some examples of the method, apparatuses, and non-transitory computer-readable medium described herein, the second set of time-frequency resources of the CRS configuration overlaps with a first subset of the first portion of the first REG bundle in the first symbol period and the third set of time-frequency resources further include a second subset of the first portion of the first REG bundle in the first symbol period.

Some examples of the method, apparatuses, and non-transitory computer-readable medium described herein may further include operations, features, means, or instructions for transmitting a downlink control message to the UE within a portion of the first set of time-frequency resources exclusive of the second set of time-frequency resources and the third set of time-frequency resources.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIGS. 17 through 19 show flowcharts illustrating methods that support overlapping downlink control channel and CRS bandwidths in accordance with one or more aspects of the present disclosure.

DETAILED DESCRIPTION

Figure 1:
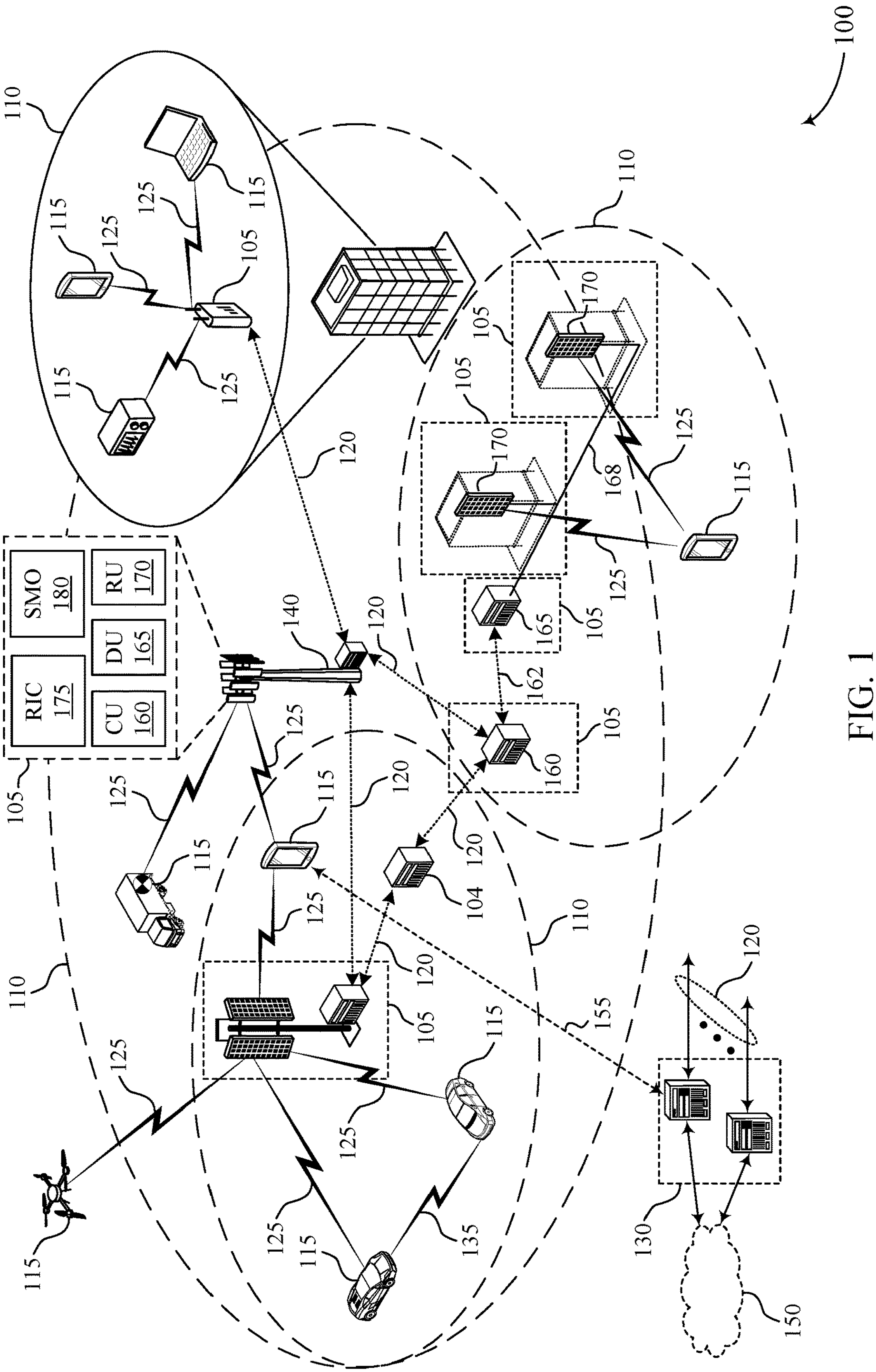
FIG. 1 illustrates an example of a wireless communications system that supports overlapping downlink control channel and cell-specific reference signal (CRS) bandwidths in accordance with one or more aspects of the present disclosure.

Some wireless communications systems may support one or more radio access technologies (RATs), such as a Fifth Generation (5G) RAT (e.g., a New Radio (NR) access technology) or a Fourth Generation (4G) RAT (e.g., a Long Term Evolution (LTE) RAT), or any combination thereof. Different RATs may utilize different sets of resources to communicate different types of signals. For example, 5G physical downlink control channel (PDCCH) resources may include control resource sets (CORESETs) that are used to communicate 5G control signaling, including demodulation reference signals (DMRSs). Similarly, an LTE RAT may utilize a set of resources used to communicate cell-specific reference signals (CRS s). In some cases, the NR PDCCH bandwidth and the LTE CRS bandwidth may partially overlap with one another (e.g., the LTE CRS bandwidth "punctures" the NR PDCCH bandwidth). In such cases, other control signals such as DMRSs are not able to be transmitted in the PDCCH resources that overlap with the LTE CRS resources. Moreover, in cases where the LTE CRS bandwidth punctures the NR PDCCH bandwidth, it is unclear whether (or to what extent) DMRSs are able to be transmitted on other PDCCH resources that do not overlap with the LTE CRS resources.

Accordingly, aspects of the present disclosure support different rules or configurations that enable DMRSs to be transmitted within PDCCH resources when CRS resources overlap with (e.g., puncture) the PDCCH resources. In particular, aspects of the present disclosure support different DMRS configurations/patterns that enable DMRSs to be communicated on PDCCH resources associated with a first RAT (e.g., 5G, NR) that do not overlap with CRS resources associated with a second RAT (e.g., 4G, LTE). For example, a UE may receive a PDCCH configuration associated with a first RAT including multiple control channel elements (CCEs), and a CRS configuration associated with a second RAT that at least partially overlaps with one of the CCEs. In this example, the UE may determine a DMRS configuration within the CCEs based on the PDCCH configuration and the CRS configuration, and may receive a DMRS within the CCEs of the PDCCH resources based on the determined DMRS configuration. In other words, the identified DMRS configuration may enable the UE to receive DMRSs within the PDCCH resources that do not overlap with the CRS resources.

In some aspects, the DMRS configuration may be determined within the PDCCH resources according to different granularities. In some cases, the DMRS configuration may include resources of the CCEs within a symbol (e.g., symbol period) that does not include any LTE CRS resources (e.g., DMRS configuration per-CORESET). In other cases, the DMRS configuration may include all the resources of each CCE that does not overlap with the LTE CRS resources (e.g., DMRS configuration per-CCE). In other cases, the DMRS configuration may include all the resources of each resource element group (REG) of a CCE that does not overlap with the LTE CRS resources (e.g., DMRS configuration per-REG).

Aspects of the disclosure are initially described in the context of wireless communications systems. Additional aspects of the disclosure are described in the context of an example network architecture, example DMRS configurations, and an example process flow. Aspects of the disclosure are further illustrated by and described with reference to apparatus diagrams, system diagrams, and flowcharts that relate to overlapping downlink control channel and CRS bandwidths.

FIG. 1 illustrates an example of a wireless communications system 100 that supports overlapping downlink control channel and CRS bandwidths in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support overlapping downlink control channel and CRS bandwidths as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$, may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a CRS, a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, the wireless communications system 100 may support different rules or configurations that enable DMRSs to be transmitted within PDCCH resources when CRS resources overlap with (e.g., puncture) the PDCCH resources. In particular, aspects of the present disclosure support different DMRS configurations that enable DMRSs to be communicated on PDCCH resources associated with a first RAT (e.g., 5G, NR) that do not overlap with CRS resources associated with a second RAT (e.g., 4G, LTE).

For example, a UE 115 of the wireless communications system 100 may receive a PDCCH configuration associated with a first RAT including multiple CCEs, and a CRS configuration associated with a second RAT that at least partially overlaps with one of the CCEs. In this example, the UE 115 may determine a DMRS configuration within the CCEs based on the PDCCH configuration and the CRS configuration, and may receive a DMRS within the CCEs of the PDCCH resources based on the determined DMRS configuration. In other words, the identified DMRS configuration may enable the UE 115 to receive DMRSs within the PDCCH resources that do not overlap with the CRS resources.

In some aspects, the DMRS configuration may be determined within the PDCCH resources according to different granularities. In some cases, the DMRS configuration may include resources of the CCEs within a symbol (e.g., symbol period) that does not include any LTE CRS resources (e.g., DMRS configuration per-CORESET). In other cases, the DMRS configuration may include all the resources of each CCE that does not overlap with the LTE CRS resources (e.g., DMRS configuration per-CCE). In other cases, the DMRS configuration may include all the resources of each REG of a CCE that does not overlap with the LTE CRS resources (e.g., DMRS configuration per-REG).

Techniques described herein may enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system 100. As such, by facilitating communication of DMRSs, aspects of the present disclosure may improve a reliability and efficiency of wireless communications within the wireless communications system 100.

Figure 2:
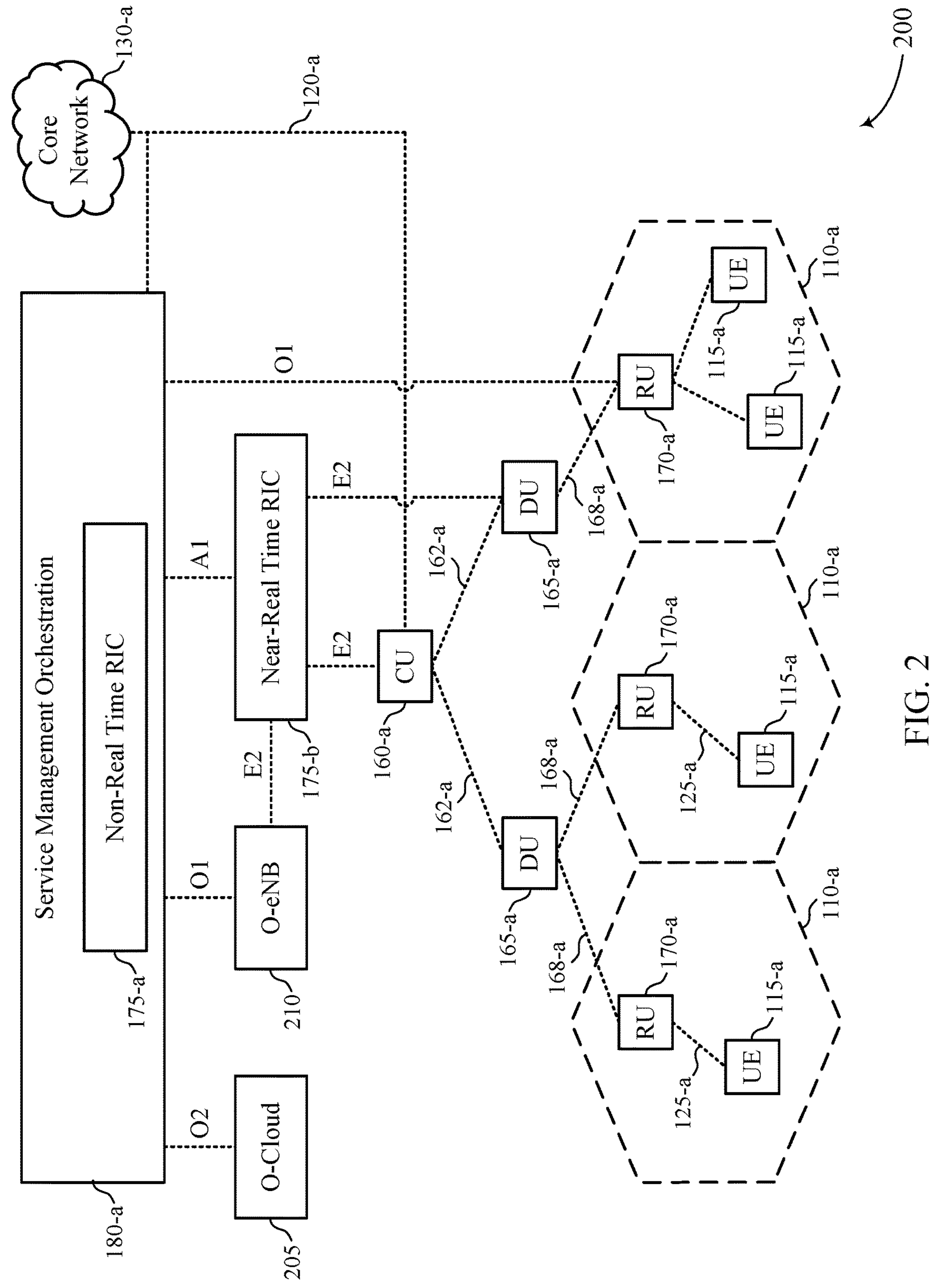
FIG. 2 illustrates an example of a network architecture that supports overlapping downlink control channel and CRS bandwidths in accordance with one or more aspects of the present disclosure.

FIG. 2 illustrates an example of a network architecture 200 (e.g., a disaggregated base station architecture, a disaggregated RAN architecture) that supports overlapping downlink control channel and CRS bandwidths in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
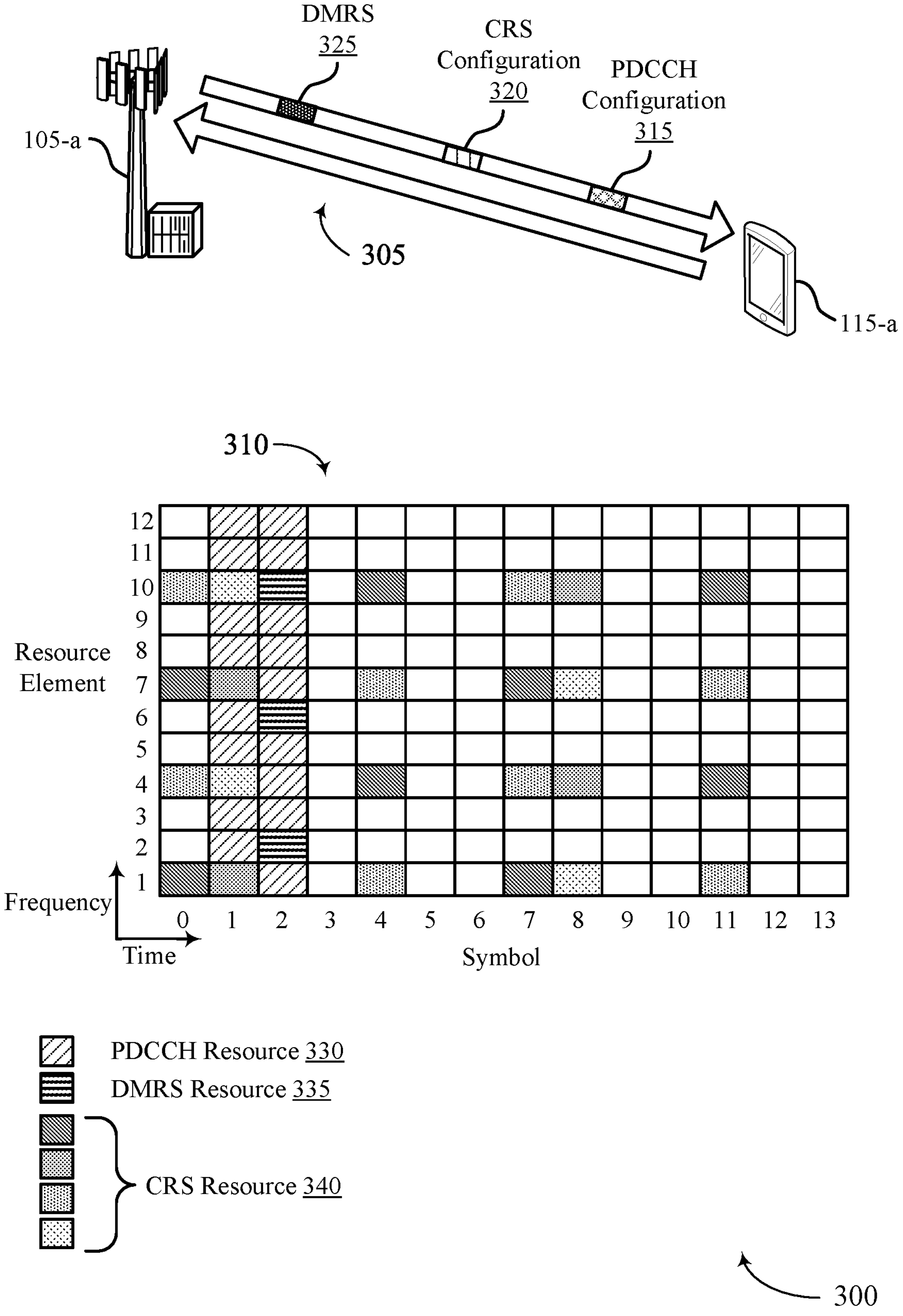
FIG. 3 illustrates an example of a wireless communications system that supports overlapping downlink control channel and CRS bandwidths in accordance with one or more aspects of the present disclosure.

FIG. 3 illustrates an example of a wireless communications system 300 that supports overlapping downlink control channel and CRS bandwidths in accordance with one or more aspects of the present disclosure. In some examples, aspects of the wireless communications system 300 may implement, or be implemented by, aspects of the wireless communications system 100, the network architecture 200, or both. In particular, the wireless communications system 300 may support rules or configurations that enable DMRSs to be transmitted within PDCCH resources when CRS resources overlap with (e.g., puncture) the PDCCH resources, as described with respect to FIG. 1.

The wireless communications system 300 may include a network entity 105-*a* and a UE 115-*a*. The UE 115-*a* may communicate with the network entity 105-*a* using a communication link 305, which may be an example of an NR or LTE link between the respective UE 115-*a* and the network entity 105-*a*. In some cases, the communication link 305 may include an example of an access link (e.g., Uu link) which may include a bi-directional link that enables both uplink and downlink communication. For example, the UE 115-*a* may transmit uplink signals, such as uplink control signals or uplink data signals, to one or more components of the network entity 105-*a* using the communication link 305, and one or more components of the network entity 105-*a* may transmit downlink signals, such as downlink control signals or downlink data signals, to the UE 115-*a* using the communication link 305.

In some implementations, the wireless communications system 300 may support wireless communications via one or more different RATs, including, but not limited to, 5G, NR, 4G, and LTE. In other words, the wireless communications system 300 may support coexistence of 5G/NR communications and 4G/LTE communications. As noted previously herein, different RATs may utilize different sets of resources to communicate different types of signals.

For example, NR PDCCH resources may include CORESETs that are used to communicate 5G control signaling, including DMRS. In the context of an NR PDCCH configuration, the PDCCH resources may be divided up into different granularities of resources. In particular, an NR PDCCH may be formed by (e.g., include) one or more CCEs, where a CCE is formed by (e.g., includes) one or more REG bundles (REGbs). Further, a REG bundle (REGb) may be formed by (e.g., include) one or more REGs that are consecutive in time, in frequency, or both in time and frequency, where a REG includes a resource that spans one resource block and one OFDM symbol (e.g., one OFDM symbol period). In each REG, DMRSs may be transmitted in a subset of resource elements. For example, in each REG, DMRS resource elements may include resource elements #1, #5, and #9 (e.g., DMRSs may be transmitted on resource elements #1, #5, and #9). A precoder for DMRS may be assumed to be the same within a REG bundle or within a set of contiguous resource blocks of a CORESET.

A PDCCH configuration may exhibit a non-interleaved CCE-to-REG mapping configuration or an interleaved CCE-to-REG mapping configuration. A non-interleaved mapping configuration may include one or more CCEs that each include a sets of multiple REGs that are contiguous in the frequency domain. Comparatively, an interleaved mapping configuration may include CCEs that include multiple REGs that are not contiguous (e.g., separated from one another) in the frequency domain. Interleaved and non-interleaved CCE-to-REG mapping configurations will be shown and described in further detail with respect to FIGS. 4-7.

The coexistence of multiple RATs within a wireless communications system may result in conflicts when sets of resources for the respective RATs overlap with one another. For example, in some cases, PDCCH resources associated with a first RAT (e.g., 5G, NR) may partially overlap with CRS resources of a second RAT (e.g., 4G, LTE). In other words, LTE CRS resources may "puncture" NR PDCCH resources. In such cases, other control signals such as DMRSs are not able to be transmitted in the PDCCH resources that overlap with the CRS resources. Moreover, in cases where the CRS resources puncture PDCCH resources, it may be unclear whether (or to what extent) DMRSs are able to be transmitted on other PDCCH resources that do not overlap with the CRS resources.

Accordingly, the wireless communications system 300 may support different rules or configurations that enable DMRSs 325 to be transmitted within PDCCH resources 330 when CRS resources 340 overlap with (e.g., puncture) the PDCCH resources 330. In particular, aspects of the present disclosure support different DMRS configurations that enable DMRSs 325 to be communicated on PDCCH resources 330 associated with a first RAT (e.g., 5G, NR) that do not overlap with CRS resources 340 associated with a second RAT (e.g., 4G, LTE).

Attendant advantages of the present disclosure may be further shown and described with respect to the resource configuration 310 illustrated in FIG. 3. As shown in the resource configuration 310, the UE 115-*a* may receive a PDCCH configuration 315 associated with a first RAT including multiple CCEs. The PDCCH configuration 315 may indicate or include a set of PDCCH resources 330 (e.g., CORESET) that spans two or three consecutive symbol periods in the time domain. For example, the PDCCH configuration 315 may be associated with a set of PDCCH resources 330 that spans consecutive Symbols 1 and 2 of the resource configuration 310.

The UE 115-*a* may additionally receive a CRS configuration 320 associated with a second RAT, where the CRS configuration 320 indicates or includes CRS resources 340 that at least partially overlap with the PDCCH resources 330. For example, as shown in the resource configuration 310, the CRS resources 340 overlap with the OFDM symbols of the PDCCH resources 330 within Symbol 1. In this regard, at least one symbol period (e.g., Symbol 2) of the PDCCH resources 330 may not overlap with the CRS resources 340.

In accordance with some implementations/DMRS configurations (e.g., DMRS configuration 400 illustrated in FIG. 4), PDCCH DMRS may not be transmitted on symbol periods where CRS resources 340 are present. On symbol periods where CRS resources 340 are not present, DMRS may be mapped in the same way as for conventional PDCCH resources or CORESETs (e.g., DMRS resources 335 are mapped on resource elements #1, #5, #9 in each REG), as shown in the resource configuration 310. Moreover, a PDCCH payload may be mapped on resource elements used for monitored PDCCH and not used for the associated PDCCH DMRS in the same way as for some traditional PDCCH/CORESET, and then is punctured at resource elements overlapping or colliding with LTE CRS resources. Stated differently, the UE 115-*a* may monitor for (and receive) non-DMRS downlink control messages within PDCCH resources 330 that are not allocated for DMRS resources 335, and which do not overlap with CRS resources 340.

Some aspects of the present disclosure are directed to DMRS configurations (e.g., DMRS configurations 400-700 illustrated in FIGS. 4-7) that are used to determine how DMRS resources 335 are mapped within PDCCH resources 330 in cases where the PDCCH resources 330 at least partially overlap with CRS resources 340, as shown in the resource configuration 310. Moreover, DMRS configurations described herein may enable DMRS mapping while retaining characteristics or parameters of conventional PDCCH resources/CORESETs, including REG bundle sizes, CCE-to-REG mapping configurations, and aggregation levels.

An example may prove to be illustrative. Referring to the wireless communications system 300 illustrated in FIG. 3, the UE 115-*a* may receive first control signaling indicating a downlink control channel configuration (e.g., PDCCH configuration 315) associated with a first RAT. For example, the UE 115-*a* may receive first control signaling (e.g., RRC signaling) that indicates a PDCCH configuration 315 associated with a 5G RAT and/or an NR access technology. The downlink control channel configuration may be associated with a non-interleaved mapping configuration or an interleaved mapping configuration, as will be further shown and described in FIGS. 4-7. The PDCCH configuration 315 may indicate or be associated with a first set of time-frequency resources (e.g., PDCCH resource s330). Moreover, the first set of time-frequency resources may include one or more CCEs.

The UE 115-*a* may receive second control signaling indicating a CRS configuration 320 associated with a second RAT. In some cases, the UE 115-*a* may receive the second control signaling for the CRS configuration 320 based on receiving the first control signaling for the PDCCH configuration 315. The CRS configuration 320 may indicate or be associated with a second set of time-frequency resources (e.g., CRS resources 340). Moreover, the CRS resources 340 may at least partially overlap with at least one CCE of the PDCCH resources 330 of the PDCCH configuration 315. That is, a CRS bandwidth may at least partially overlap with the PDCCH bandwidth.

In some implementations, the UE 115-*a* may expect to be configured with a PDCCH configuration 315 such that that some of REG bundles or CCEs of the PDCCH configuration 315 that the UE 115-*a* is expected to monitor overlap with CRS resources 340, where some other REG-bundles or CCEs do not overlap with CRS resources 340 within a given PDCCH monitoring occasion. That is, the UE 115-*a* may expect to be configured with a PDCCH configuration 315 and CRS configuration 320 that cause all of the REG bundles/CCEs to at least partially overlap with the CRS resources 340, or that cause none of the REG bundles/CCEs to at least partially overlap with the CRS resources 340. In this regard, in some cases, the network entity 105-*a* may configure the downlink control channel configuration (e.g., NR-PDCCH configuration 315/CORESET) and/or CRS configuration 320 such that the CORESET bandwidth and the CRS bandwidth fully overlap with one another, or do not overlap at all.

In some aspects, the UE 115-*a*, the network entity 105-*a*, or both, may identify a DMRS configuration that is to be used. In particular, the UE 115-*a* and/or the network entity 105-*a* may identify which DMRS configuration will be used to identify DMRS resources 335 based on the PDCCH configuration 315 and the CRS configuration 320. In other words, the UE 115-*a*, the network entity 105-*a*, or both, may identify which of the DMRS configurations 400-700 illustrated in FIGS. 4-7 will be used to identify DMRS resources 335.

In some implementations, the network entity 105-*a* may indicate which DMRS configuration 400-700 is to be used or applied via the first control signaling used to indicate the PDCCH configuration 315, via the second control signaling used to indicate the CRS configuration 320, via additional control signaling (e.g., RRC signaling, downlink control information (DCI) signaling, MAC-control element (MAC-CE) signaling), or any combination thereof. In additional or alternative implementations, the UE 115-*a* may be configured (e.g., pre-configured) to use or apply one of the DMRS configurations 400-700, such as based on different time periods or based on the satisfaction of certain conditions.

The respective DMRS configurations used to map DMRS resources 335 within the set of PDCCH resources 330 will be further shown and described with reference to FIGS. 4-7.

The UE 115-*a*, the network entity 105-*a*, or both, may identify DMRS resources 335 (e.g., a third set of time-frequency resources) that are to be used for receiving/transmitting DMRSs 325. In particular, the UE 115-*a* and/or the network entity 105-*a* may identify the DMRS resources 335 based on the PDCCH configuration 315 (e.g., PDCCH resources 330) and the CRS configuration 320 (e.g., CRS resources 340), and in accordance with the identified DMRS configuration.

As will be further shown and described in FIGS. 4-7, the UE 115-*a* and/or the network entity 105-*a* may identify the set of DMRS resources 335 within the set of PDCCH resources 330 in accordance with the DMRS mapping configuration. In particular, the UE 115-*a* and/or the network entity 105-*a* may identify the DMRS resources 335 within a portion of one or more CCEs of the PDCCH resources 330 that does not overlap with the CRS resources 340. The different DMRS configurations 400, 500, 600, 700 may cause the UE 115-*a* and/or the network entity 105-*a* to identify DMRS resources 335 with varying granularities. For example, the DMRS configuration 400 illustrated in FIG. 4 may be used to identify DMRS resources 335 on a per-CORESET basis, whereas the DMRS configuration 500 illustrated in FIG. 5 may be used to identify DMRS resources 335 on a per-CCE basis. Moreover, the DMRS configuration 600 illustrated in FIG. 6 may be used to identify DMRS resources 335 on a per-REG bundle basis, whereas the DMRS configuration 700 illustrated in FIG. 7 may be used to identify DMRS resources 335 on a per-sub-REG bundle basis (e.g., per-fraction of a REG bundle-basis).

In some aspects, the UE 115-*a* may monitor, process, and/or blindly decode certain quantities and/or types of CCEs of the first set of time-frequency resources of the downlink control channel configuration. For example, as will be described in further detail with respect to FIGS. 4-7, different DMRS configurations may result in different types of CCEs, where the different types of CCEs may vary in a level or degree of overlap with CRS resources 340, and/or vary with respect to patterns of DMRS resources 335 within the respective CCEs. For example, the DMRS configuration 400 illustrated in FIG. 4 may result in one type of CCE 430, whereas the DMRS configuration 500 illustrated in FIG. 5 may result in up to two different types of CCEs 530. Moreover, the DMRS configuration 600 illustrated in FIG. 6 may result in up to three different types of CCEs 630, and the DMRS configuration 700 illustrated in FIG. 7 may result in up to four different types of CCEs 730.

As will be described in further detail herein, the different types of CCEs may be treated the same or differently with respect to how many CCEs the UE 115-*a* is configured to process, monitor, and/or decode within a given monitoring occasion, span, or slot. As such, the UE 115-*a* may be configured to determine whether the UE 115-*a* is to treat different type of CCEs the same or different from one another, and identify applicable threshold quantities of CCEs that the UE 115-*a* is able or expected to process or monitor within a given monitoring occasion, span, or slot.

Subsequently, the UE 115-*a* may receive, from the network entity 105-*a*, a DMRS 325 within the third set of time-frequency resources (e.g., DMRS resources 335). In this regard, the UE 115-*a* may receive, and the network entity 105-*a* may transmit, the DMRS 325 based on the PDCCH configuration 315, the CRS configuration 320, the DMRS configuration, or any combination thereof.

For example, the UE 115-*a* may receive the DMRS 325 within the DMRS resources 335 illustrated in the resource configuration 310. In this regard, the UE 115-*a* may receive the DMRS 325 within a portion of the PDCCH resources 330 that does not overlap with the CRS resources 340.

In some implementations, the UE 115-*a* may receive, from the network entity 105-*a*, a downlink control message (e.g., PDCCH message) within a portion of the PDCCH resources 330 that is not allocated for DMRS 325. In particular, the UE 115-*a* may receive a downlink control message within a portion of the PDCCH resources 330 that does not overlap with CRS resources 340, and that is not allocated for DMRS 325.

For example, referring to the resource configuration 310, the UE 115-*a* may receive a downlink control message (e.g., a non-DMRS control message) within Symbols 1 and 2 across resource elements 11 and 12, within Symbols 1 and 2 across resource elements 8 and 9, within Symbol 2 of resource element 7, etc.

Techniques described herein may enable DMRSs 325 to be communicated within PDCCH resources 330 that at least partially overlap with CRS resources 340. In particular, aspects of the present disclosure may enable DMRSs 325 to be transmitted within PDCCH resources 330 associated with a first RAT (e.g., 5G, NR) in cases where the PDCCH resources 330 are "punctured" by CRS resources 340 associated with a second RAT (e.g., 4G, LTE). In this regard, aspects of the present disclosure may preserve use of PDCCH resources 330 even in cases where the PDCCH resources 330 conflict with (e.g., overlap) resources of a different RAT, thereby facilitating communication of DMRSs 325 and improving resource utilization within the wireless communications system. As such, by facilitating communication of DMRSs 325, aspects of the present disclosure may improve a reliability and efficiency of wireless communications within the wireless communications system.

Figure 4:
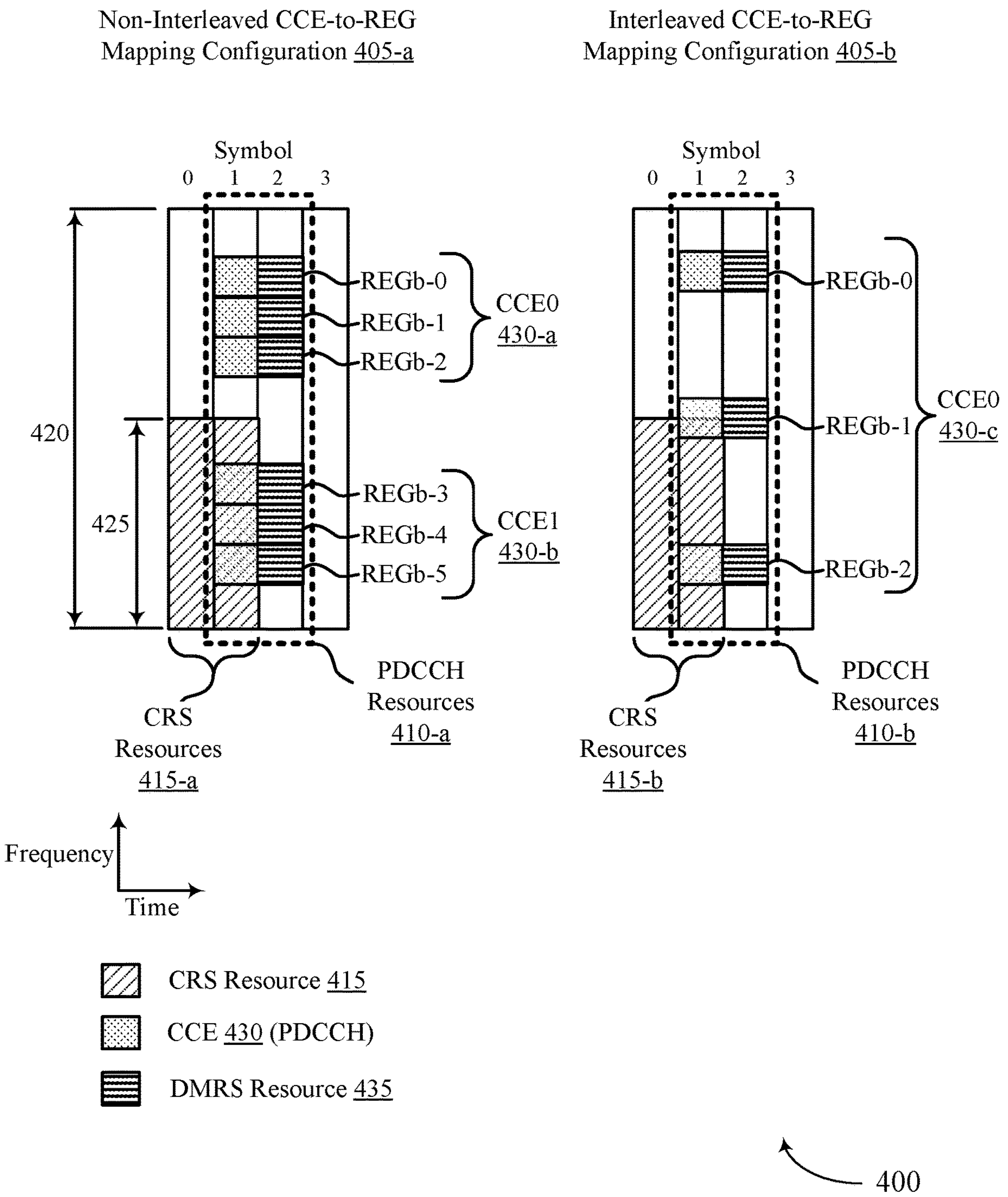
FIGS. 4-7 illustrate examples DMRS configurations that support overlapping downlink control channel and CRS bandwidths in accordance with one or more aspects of the present disclosure.

FIG. 4 illustrates an example of a DMRS configuration 400 that supports overlapping downlink control channel and CRS bandwidths in accordance with one or more aspects of the present disclosure. In some examples, aspects of the DMRS configuration 400 may implement, or be implemented by, aspects of the wireless communications system 100, the network architecture 200, the wireless communications system 300, or any combination thereof. In particular, the DMRS configuration 400 may enable DMRSs to be communicated on PDCCH resources associated with a first RAT that at least partially overlap with CRS resources associated with a second RAT, as described with reference to FIGS. 1-3, among other aspects.

The DMRS configuration 400 illustrates a non-interleaved CCE-to-REG mapping configuration 405-*a* and an interleaved CCE-to-REG mapping configuration 405-*b*. The mapping configurations 405-*a*, 405-*b* illustrate sets of resources including a sets of PDCCH resources 410-*a*, 410-*b*, and CRS resources 415-*a*, 415-*b*. The sets of PDCCH resources 410 may be associated with a first RAT, such as 5G, NR, or both. Comparatively, the CRS resources 415 may be associated with a second RAT, such as 4G, LTE, or both. In some aspects, the PDCCH resources 410 may be associated with a PDCCH bandwidth 420, and the CRS resources 415 may be associated with a CRS bandwidth 425. The DMRS configuration 400 illustrated in FIG. 4 depicts resources in the frequency domain along the y-axis, and depicts resources in the time domain along the x-axis.

As noted previously herein, a UE 115 may receive control signaling (e.g., RRC signaling) indicating a PDCCH configuration that includes or indicates the PDCCH resources 410, the PDCCH bandwidth 420, or both. Moreover, the PDCCH configuration may indicate or be associated with the non-interleaved CCE-to-REG mapping configuration 405-*a* or the interleaved CCE-to-REG mapping configuration 405-*b*. Similarly, the UE 115 may receive control signaling (e.g., RRC signaling) indicating a CRS configuration that includes or indicates the CRS resources 415, the CRS bandwidth 425, or both.

A PDCCH configuration (e.g., PDCCH resources 410) may include or be associated with a CORESET that spans one or more symbols (e.g., one or more symbol periods) in the frequency domain. For example, as shown in FIG. 4, PDCCH resources 410 may span two symbols (e.g., Symbols 1 and 2) in the frequency domain. Referring to the non-interleaved mapping configuration 405-*a*, the PDCCH configuration may include a first CCE 430-*a* (CCE0) including REG bundles 0-2 (e.g., REGb 0-2) that are contiguous in the frequency domain, and a second CCE 430-*b* (CCE1) including REG bundles 3-5 that are contiguous in the frequency domain. Comparatively, referring to the interleaved mapping configuration 405-*b*, the PDCCH configuration may include a CCE 430-*c* (CCE0) including REG bundles 0-2 that are not contiguous in the frequency domain. In some cases, each REG bundle (e.g., REGb, or REGb-x) may span one resource block in the frequency domain and two symbols (e.g., two symbol periods) in the time domain. As shown in FIG. 4, each of the CCEs 430-*a*, 430-*b*, and 430-*c* may span Symbols 1 and 2 associated with the respective sets of PDCCH resources 410-*a*, 410-*b*. In some other cases, each REG bundle (e.g., REGb, or REGb-x) may span three resource blocks in the frequency domain and two symbols (e.g., two symbol periods) in the time domain, which is not shown in FIG. 4. In some aspects, a PDCCH candidate or monitoring occasion may include one or more CCEs 430.

In some cases, as shown in FIG. 4, the PDCCH bandwidth 420 (e.g., NR-PDCCH CORESET bandwidth) and the CRS bandwidth 425 (e.g., LTE CRS bandwidth) may at least partially overlap with one another. For example, referring to the non-interleaved mapping configuration 405-*a*, the CRS resources 415-*a* do not overlap with the first CCE 430-*a* of the PDCCH resources 410-*a*, but do overlap with the second CCE 430-*b* of the PDCCH resources 410-*a* on Symbol 1. By way of another example, referring to the interleaved mapping configuration 405-*b*, the CRS resources 415-*b* do not overlap with REGb-0 of the CCE 430-*c*, but partially and fully partially overlap with REGb-1 and REGb-2 of CCE 430-*c* on Symbol 1, respectively.

As noted previously herein, according to some conventional techniques, it may unclear whether (or to what extent) DMRSs are able to be transmitted on PDCCH resources 410 in cases where the PDCCH resources 410 overlap with the CRS resources 415, as shown in FIG. 4. In particular, according to some conventional techniques, is not clear how NR-PDCCH/DMRS is structured, and how the UE 115 is to perform channel estimation and decoding within the PDCCH resources 410.

Accordingly, the DMRS configuration 400 illustrates a resource configuration that enables DMRSs to be transmitted on PDCCH resources 410 that do not overlap with CRS resources 415. In particular, the DMRS configuration 400 illustrates a configuration that enables DMRS resources 435 to be implemented within PDCCH resources 410 on a per-CORESET basis. According to the DMRS configuration 400, the DMRS structure may apply to any REG bundles of PDCCH candidates associated with a search space set of the CORESET regardless of whether a REG bundle or a CCE 430 overlaps with CRS resources 415 or not.

Stated differently, the DMRS configuration 400 may include DMRS resources 435 within symbols (e.g., symbol periods) of the PDCCH resources 410 that do not overlap with the CRS resources 415. In other words, the DMRS configuration 400 may include DMRS resources 435 for each resource of a symbol that does not include CRS resources 415.

For example, referring to the non-interleaved mapping configuration 405-*a*, the CRS resources 415-*a* partially overlap with the second CCE 430-*b* within Symbol 1 of the PDCCH resources 410-*a*. The UE 115 and/or the network entity 105 may identify which PDCCH resources 410 include DMRS resources 435 based on the PDCCH configuration and the CRS configuration, and in accordance with the DMRS configuration. As such, according to the DMRS configuration 400, no PDCCH resources 410 within Symbol 1 may include DMRS resources 435 due to the CRS resources 415-*a* overlapping in Symbol 1, and all PDCCH resources 410 within Symbol 2 may include DMRS resources 435 due to the fact that the CRS resources 415-*a* do not overlap with the PDCCH resources 410-*a* in Symbol 2. Thus, the DMRS configuration 400 may include all PDCCH resources 410 of the set of PDCCH resources 410-*a* within Symbol 2.

By way of another example, referring to the interleaved mapping configuration 405-*b*, the CRS resources 415-*b* fully overlap with REGb-2 of CCE 430-*c* within Symbol 1 of the PDCCH resources 410-*b*, and partially overlap with REGb-1 of CCE 430-*c* within Symbol 1 of the PDCCH resources 410-*b*. As such, according to the DMRS configuration 400, no PDCCH resources 410 within Symbol 1 may include DMRS resources 435 due to the CRS resources 415-*b* overlapping in Symbol 1, and all PDCCH resources 410 within Symbol 2 may include DMRS resources 435 due to the fact that the CRS resources 415-*b* do not overlap with the PDCCH resources 410-*b* in Symbol 2. Thus, the DMRS configuration 400 may include all PDCCH resources 410 of the set of PDCCH resources 410-*b* within Symbol 2.

As shown in FIG. 4, CCEs 430 within the non-interleaved mapping configuration 405-*a* (and within the interleaved mapping configuration 405-*b*) exhibit the same degree, level, or amount of overlap with the CRS resources 415, and/or exhibit the same format with respect to DMRS resources 435. In this regard, the CCEs 430 may be said to exhibit the same CCE type. For example, the first CCE 430-*a* and the second CCE 430-*b* exhibit the same format of DMRS resources 435, where the DMRS resources 435 are present only in Symbol 2 of the respective CCEs 430-*a*, 430-*b*. As such, the CCEs 430-*a*, 430-*b* may be said to be of the same type (e.g., same CCE type).

Figure 5:
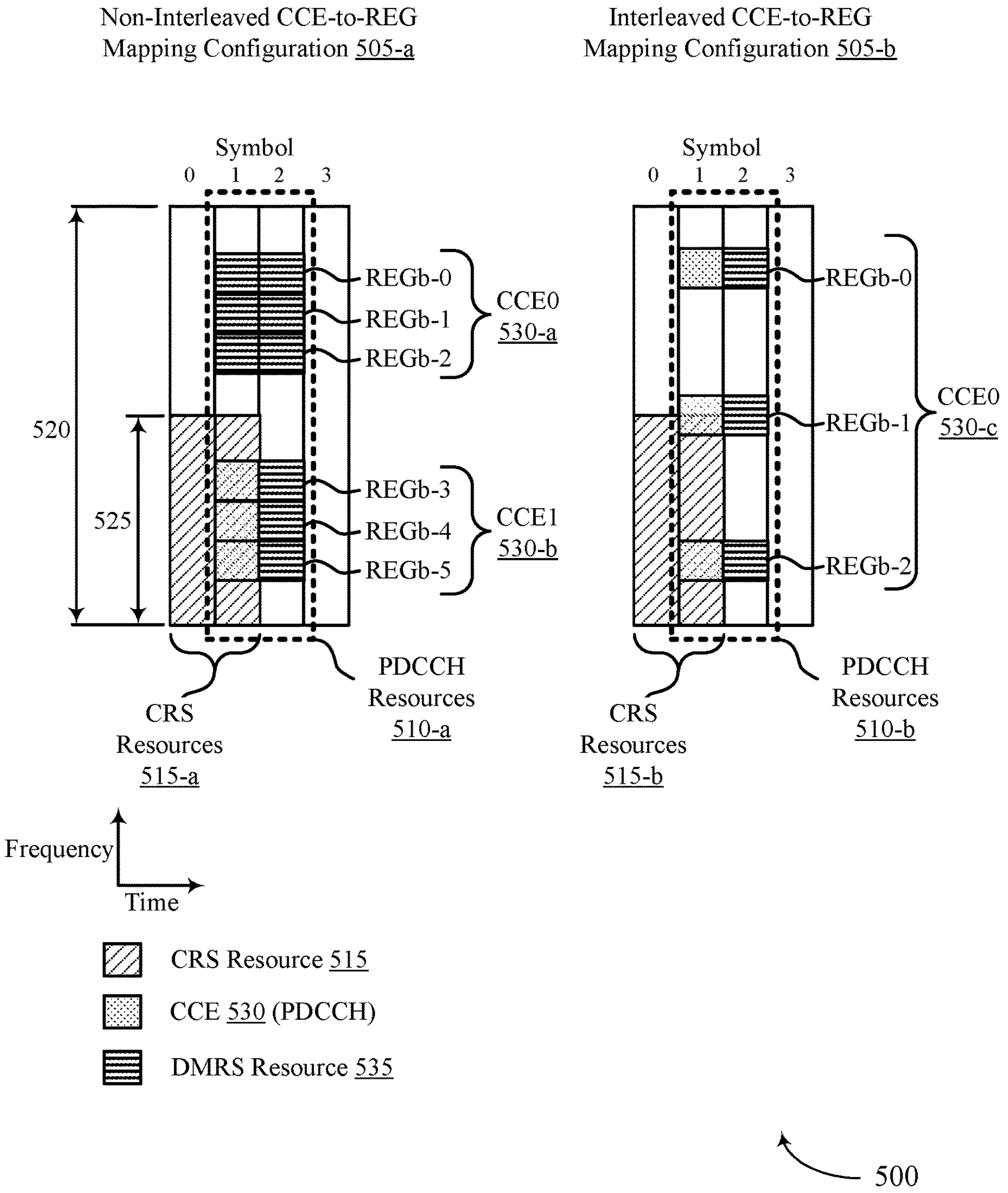

FIG. 5 illustrates an example of a DMRS configuration 500 that supports overlapping downlink control channel In some examples, aspects of the DMRS configuration 500 may implement, or be implemented by, aspects of the wireless communications system 100, the network architecture 200, the wireless communications system 300, or any combination thereof. In particular, the DMRS configuration 500 may enable DMRSs to be communicated on PDCCH resources associated with a first RAT that at least partially overlap with CRS resources associated with a second RAT, as described with reference to FIGS. 1-4, among other aspects.

The DMRS configuration 500 illustrates a non-interleaved CCE-to-REG mapping configuration 505-*a* and an interleaved CCE-to-REG mapping configuration 505-*b*. The mapping configurations 505-*a*, 505-*b* illustrate sets of resources including a sets of PDCCH resources 510-*a*, 510-*b*, and CRS resources 515-*a*, 515-*b*. The sets of PDCCH resources 510 may be associated with a first RAT, such as 5G, NR, or both. Comparatively, the CRS resources 515 may be associated with a second RAT, such as 4G, LTE, or both. In some aspects, the PDCCH resources 510 may be associated with a PDCCH bandwidth 520, and the CRS resources 515 may be associated with a CRS bandwidth 525. The DMRS configuration 500 illustrated in FIG. 5 depicts resources in the frequency domain along the y-axis, and depicts resources in the time domain along the x-axis.

As noted previously herein, a UE 115 may receive control signaling (e.g., RRC signaling) indicating a PDCCH configuration that includes or indicates the PDCCH resources 510, the PDCCH bandwidth 520, or both. Moreover, the PDCCH configuration may indicate or be associated with the non-interleaved CCE-to-REG mapping configuration 505-*a* or the interleaved CCE-to-REG mapping configuration 505-*b*. Similarly, the UE 115 may receive control signaling (e.g., RRC signaling) indicating a CRS configuration that includes or indicates the CRS resources 515, the CRS bandwidth 525, or both.

A PDCCH configuration (e.g., PDCCH resources 510) may include or be associated with a CORESET that spans one or more symbols in the frequency domain. For example, as shown in FIG. 4, PDCCH resources may span two symbols (e.g., Symbols 1 and 2) in the frequency domain. Referring to the non-interleaved mapping configuration 505-*a*, the PDCCH configuration may include a first CCE 530-*a* (CCE0) including REG bundles 0-2 (e.g., REGb 0-2) that are contiguous in the frequency domain, and a second CCE 530-*b* (CCE1) including REG bundles 3-5 that are contiguous in the frequency domain. Comparatively, referring to the interleaved mapping configuration 505-*b*, the PDCCH configuration may include a CCE 530-*c* (CCE0) including REGb 0-2 that are not contiguous in the frequency domain. In some cases, each REG bundle (e.g., REGb, or REGb-x) may span one resource block in the frequency domain and two symbols (e.g., two symbol periods) in the time domain. As shown in FIG. 5, each of the CCEs 530-*a*, 530-*b*, and 530-*c* may span Symbols 1 and 2 associated with the respective sets of PDCCH resources 510-*a*, 510-*b*. In some other cases, each REG bundle (e.g., REGb, or REGb-x) may span three resource blocks in the frequency domain and two symbols (e.g., two symbol periods) in the time domain, which is not shown in FIG. 5. In some aspects, a PDCCH candidate or monitoring occasion may include one or more CCEs 530.

In some cases, as shown in FIG. 5, the PDCCH bandwidth 520 (e.g., NR-PDCCH CORESET bandwidth) and the CRS bandwidth 525 (e.g., LTE CRS bandwidth) may at least partially overlap with one another. For example, referring to the non-interleaved mapping configuration 505-*a*, the CRS resources 515-*a* do not overlap with the first CCE 530-*a* of the PDCCH resources 510-*a*, but do overlap with the second CCE 530-*b* of the PDCCH resources 510-*a* on Symbol 1. By way of another example, referring to the interleaved mapping configuration 505-*b*, the CRS resources 515-*b* do not overlap with REGb-0 of the CCE 530-*c*, but partially and fully partially overlap with REGb-1 and REGb-2 of CCE 530-*c* on Symbol 1, respectively.

As noted previously herein, according to some conventional techniques, it may unclear whether (or to what extent) DMRSs are able to be transmitted on PDCCH resources 510 in cases where the PDCCH resources 510 overlap with the CRS resources 515, as shown in FIG. 4. In particular, according to some conventional techniques, is not clear how NR-PDCCH/DMRS is structured, and how the UE 115 is to perform channel estimation and decoding within the PDCCH resources 510.

Accordingly, the DMRS configuration 500 illustrates a resource configuration that enables DMRSs to be transmitted on PDCCH resources 510 that do not overlap with CRS resources 515. In particular, the DMRS configuration 500 illustrates a configuration that enables DMRS resources 535 to be implemented within PDCCH resources 510 on a per-CCE basis. According to the DMRS configuration 500, the DMRS structure may apply to any REG bundles of a CCE 530 that overlaps with a CRS resource 515. As such, a DMRS structure may apply to any REG bundles of a CCE 530 regardless of whether a REG bundle of a CCE 530 overlaps with CRS resources or not.

Stated differently, the DMRS configuration 500 may include DMRS resources 535 that include any CCEs 530 that do not overlap with CRS resources 515, as well as PDCCH resources 510 of a symbol of a CCE 530 that do not overlap with CRS resources 515. In other words, the DMRS configuration 500 may include DMRS resources 535 for each resource of a symbol that does not include CRS resources 515, as well as DMRS resources 535 within each CCE 530 that does not fully or partially overlap with CRS resources 515.

For example, referring to the non-interleaved mapping configuration 505-*a*, the CRS resources 515-*a* partially overlap with the second CCE 530-*b* within Symbol 1 of the PDCCH resources 510-*a*, and do not overlap with the first CCE 530-*a*. The UE 115 and/or the network entity 105 may identify which PDCCH resources 510 include DMRS resources 535 based on the PDCCH configuration and the CRS configuration, and in accordance with the DMRS configuration. As such, according to the DMRS configuration 500, the first CCE 530-*a* may include DMRS resources 535 due to the first CCE 530-*a* not overlapping with the CRS resources 515-*a*. Additionally, according to the DMRS configuration 500, DMRS resources 535 may also include PDCCH resources 510 of the second CCE 530-*b* within Symbol 2 due to the resources of the second CCE 530-*b* in Symbol 2 not overlapping with the CRS resources 515-*a*.

Comparing the non-interleaved mapping configuration 505-*a* illustrated in FIG. 5 and the non-interleaved mapping configuration 405-*a* illustrated in FIG. 4, the result of the DMRS configurations 400 and 500 is the same for the second CCEs 430-*b*, 530-*b*. However, the result of the DMRS configurations 400 and 500 is different for the first CCEs 430-*a*, 530-*a*. Specifically, the DMRS configuration 400 in FIG. 4 does not include DMRS resources 435 within the resources of the first CCE 430-*a* of Symbol 1, whereas the DMRS configuration 500 in FIG. 5 does include DMRS resources 535 within the resources of the first CCE 530-*a* of Symbol 1.

By way of another example, referring to the interleaved mapping configuration 505-*b*, the CRS resources 515-*b* fully overlap with REGb-2 of CCE 530-*c* within Symbol 1 of the PDCCH resources 510-*b*, and partially overlap with REGb-1 of CCE 530-*c* within Symbol 1 of the PDCCH resources 510-*b*. As such, according to the DMRS configuration 500, no PDCCH resources 510 within Symbol 1 may include DMRS resources 535 due to the CRS resources 515-*b* overlapping in Symbol 1, and all PDCCH resources 510 within Symbol 2 may include DMRS resources 535 due to the fact that the CRS resources 515-*b* do not overlap with the PDCCH resources 510-*b* in Symbol 2. Thus, the DMRS configuration 500 may include all PDCCH resources 510 of the set of PDCCH resources 510-*b* within Symbol 2.

Comparing the interleaved mapping configuration 505-*b* illustrated in FIG. 5 and the interleaved mapping configuration 405-*b* illustrated in FIG. 4, the result of the DMRS configurations 400 and 500 is the same for both the first CCEs 430-*a*, 530-*a* and the second CCEs 430-*b*, 530-*b*.

As shown in FIG. 5, the UE 115 may be configured to process, monitor, and/or decode different types of CCEs 530, where the different types of CCEs 530 differ in the degree, level, or amount of overlap with the CRS resources 515, and/or differ in format with respect to DMRS resources 535. For example, referring to the non-interleaved mapping configuration 505-*a*, the first CCE 530-*a* may exhibit a first type in that the entirety of the CCE 530-*a* includes DMRS resources 535, whereas the second CCE 530-*b* may exhibit a second type in that DMRS resources 535 are only present in Symbol 2 of the second CCE 530-*b*. Moreover, in some cases, the CCE 530-*c* illustrated in the interleaved mapping configuration 505-*b* may also be considered to be associated with the second type in that DMRS resources 535 are only present in Symbol 2 of the CCE 530-*c*.

When it comes to processing, monitoring, and/or decoding the different types of CCEs 530, the first type of CCE 530 (e.g., first CCE 530-*a*) and the second type of CCE 530 (e.g., second CCE 530-*b*) may be treated the same or differently according to different implementations. In particular, the different types of CCEs 530 may be treated the same or differently with respect to a threshold quantity N of CCEs 530 the UE 115 is able to process, monitor, or decode (where the threshold quantity N of CCEs 530 may be configured at the UE 115 and/or signaled to the UE 115).

In accordance with a first implementation, the two types of CCEs 530 may be treated equally. For example, if the UE 115 is capable of processing a threshold quantity N of CCEs 530 within a given PDCCH monitoring occasion, span, or slot, then the UE 115 may be able to totally process the threshold quantity N of CCEs 530 for both types of CCEs 530 at a given PDCCH monitoring occasion, span, or slot. In other words, the UE 115 may be able to process N quantity of a sum of CCEs 530 of the first type and the second type. If there are more than N quantity of CCEs 530 including the first type and/or the second type at a given PDCCH monitoring occasion, span, or slot, the UE 115 may not monitor one or some search space sets, so that the quantity does not exceed N.

In accordance with a second implementation, the two types of CCEs 530 may be treated differently, with separate blind decoding and/or CCE budgets for different types of CCEs 530. For example, the UE 115 may be capable of processing a first threshold quantity N1 of CCEs 530 of the first type within a given PDCCH monitoring occasion, span, or slot, and may be capable of processing a second threshold quantity N2 of CCEs 530 of the second type within a given PDCCH monitoring occasion or slot. In this example, the UE 115 may be able to process up to N1+N2 quantity of CCEs 530, where N1+N2 may be less than or equal to N representing a total quantity of CCEs 530 that the UE 115 is able to monitor within a given monitoring occasion or span or slot. If there are more than N1 quantity of CCEs 530 of the first type and/or N2 quantity of CCEs 530 of the second type at a given PDCCH monitoring occasion or span or slot, the UE 115 may not monitor one or some search space sets, so that the quantities do not exceed N1 and N2, respectively.

Figure 6:
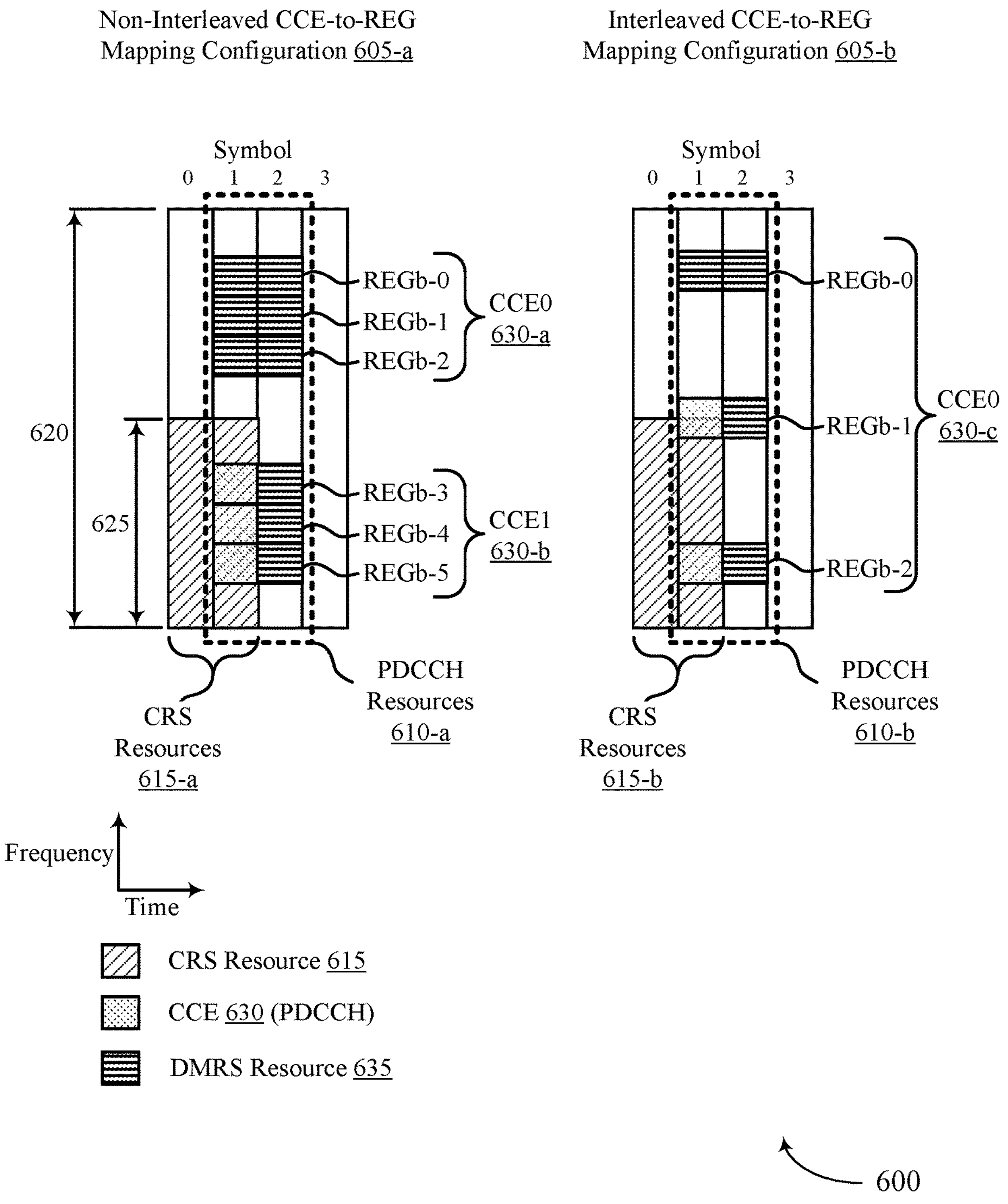

FIG. 6 illustrates an example of a DMRS configuration 600 that supports overlapping downlink control channel and CRS bandwidths in accordance with one or more aspects of the present disclosure. In some examples, aspects of the DMRS configuration 600 may implement, or be implemented by, aspects of the wireless communications system 100, the network architecture 200, the wireless communications system 300, or any combination thereof. In particular, the DMRS configuration 600 may enable DMRSs to be communicated on PDCCH resources associated with a first RAT that at least partially overlap with CRS resources associated with a second RAT, as described with reference to FIGS. 1-5, among other aspects.

The DMRS configuration 600 illustrates a non-interleaved CCE-to-REG mapping configuration 605-*a* and an interleaved CCE-to-REG mapping configuration 605-*b*. The mapping configurations 605-*a*, 605-*b* illustrate sets of resources including a sets of PDCCH resources 610-*a*, 610-*b*, and CRS resources 615-*a*, 615-*b*. The sets of PDCCH resources 610 may be associated with a first RAT, such as 5G, NR, or both. Comparatively, the CRS resources 615 may be associated with a second RAT, such as 4G, LTE, or both. In some aspects, the PDCCH resources 610 may be associated with a PDCCH bandwidth 620, and the CRS resources 615 may be associated with a CRS bandwidth 625. The DMRS configuration 600 illustrated in FIG. 6 depicts resources in the frequency domain along the y-axis, and depicts resources in the time domain along the x-axis.

As noted previously herein, a UE 115 may receive control signaling (e.g., RRC signaling) indicating a PDCCH configuration that includes or indicates the PDCCH resources 610, the PDCCH bandwidth 620, or both. Moreover, the PDCCH configuration may indicate or be associated with the non-interleaved CCE-to-REG mapping configuration 605-*a* or the interleaved CCE-to-REG mapping configuration 605-*b*. Similarly, the UE 115 may receive control signaling (e.g., RRC signaling) indicating a CRS configuration that includes or indicates the CRS resources 615, the CRS bandwidth 625, or both.

A PDCCH configuration (e.g., PDCCH resources 610) may include or be associated with a CORESET that spans one or more symbols in the frequency domain. For example, as shown in FIG. 4, PDCCH resources may span two symbols (e.g., Symbols 1 and 2) in the frequency domain.

Referring to the non-interleaved mapping configuration 605-*a*, the PDCCH configuration may include a first CCE 630-*a* (CCE0) including REG bundles 0-2 (e.g., REGb 0-2) that are contiguous in the frequency domain, and a second CCE 630-*b* (CCE1) including REG bundles 3-5 that are contiguous in the frequency domain. Comparatively, referring to the interleaved mapping configuration 605-*b*, the PDCCH configuration may include a CCE 630-*c* (CCE0) including REG bundles 0-2 that are not contiguous in the frequency domain. In some cases, each REG bundle (e.g., REGb, or REGb-x) may span one resource block in the frequency domain and two symbols (e.g., two symbol periods) in the time domain. As shown in FIG. 6, each of the CCEs 630-*a*, 630-*b*, and 630-*c* may span Symbols 1 and 2 associated with the respective sets of PDCCH resources 610-*a*, 610-*b*. In some other cases, each REG bundle (e.g., REGb, or REGb-x) may span three resource blocks in the frequency domain and two symbols (e.g., two symbol periods) in the time domain, which is not shown in FIG. 6. In some aspects, a PDCCH candidate or monitoring occasion may include one or more CCEs 630.

In some cases, as shown in FIG. 6, the PDCCH bandwidth 620 (e.g., NR-PDCCH CORESET bandwidth) and the CRS bandwidth 625 (e.g., LTE CRS bandwidth) may at least partially overlap with one another. For example, referring to the non-interleaved mapping configuration 605-*a*, the CRS resources 615-*a* do not overlap with the first CCE 630-*a* of the PDCCH resources 610-*a*, but do overlap with the second CCE 630-*b* of the PDCCH resources 610-*a* on Symbol 1. By way of another example, referring to the interleaved mapping configuration 605-*b*, the CRS resources 615-*b* do not overlap with REGb-0 of the CCE 630-*c*, but partially and fully partially overlap with REGb-1 and REGb-2 of CCE 630-*c* on Symbol 1, respectively.

As noted previously herein, according to some conventional techniques, it may unclear whether (or to what extent) DMRSs are able to be transmitted on PDCCH resources 610 in cases where the PDCCH resources 610 overlap with the CRS resources 615, as shown in FIG. 6. In particular, according to some conventional techniques, is not clear how NR-PDCCH/DMRS is structured, and how the UE 115 is to perform channel estimation and decoding within the PDCCH resources 610.

Accordingly, the DMRS configuration 600 illustrates a resource configuration that enables DMRSs to be transmitted on PDCCH resources 610 that do not overlap with CRS resources 615. In particular, the DMRS configuration 600 illustrates a configuration that enables DMRS resources 635 to be implemented within PDCCH resources 610 on a per-REG bundle basis. According to the DMRS configuration 600, the DMRS structure may apply to a REG bundle that is overlapping with CRS resource 615. That is, the DMRS structure applies to any REG bundles of a CCE 630 for a REG bundle that fully or partially overlaps with CRS resources 615.

Stated differently, the DMRS configuration 600 may include DMRS resources 635 that include any CCEs 630 that do not overlap with CRS resources 615, any REGs that do not overlap with CRS resources 615, as well as PDCCH resources 610 of a symbol of a CCE 630 that do not overlap with CRS resources 615.

For example, referring to the non-interleaved mapping configuration 605-*a*, the CRS resources 615-*a* partially overlap with the second CCE 630-*b* within Symbol 1 of the PDCCH resources 610-*a*, and do not overlap with the first CCE 630-*a*. The UE 115 and/or the network entity 105 may identify which PDCCH resources 610 include DMRS resources 635 based on the PDCCH configuration and the CRS configuration, and in accordance with the DMRS configuration. As such, according to the DMRS configuration 600, the first CCE 630-*a* may include DMRS resources 635 due to the first CCE 630-*a* not overlapping with the CRS resources 615-*a*. Additionally, according to the DMRS configuration 600, DMRS resources 635 may also include PDCCH resources 610 of the second CCE 630-*b* within Symbol 2 due to the resources of the second CCE 630-*b* in Symbol 2 not overlapping with the CRS resources 615-*a*.

Comparing the non-interleaved mapping configuration 605-*a* illustrated in FIG. 6 and the non-interleaved mapping configuration 505-*a* illustrated in FIG. 5, the result of the DMRS configurations 500 and 600 is the same for both the first CCEs 530-*a*, 630-*a* and the second CCEs 530-*b*, 630-*b*.

By way of another example, referring to the interleaved mapping configuration 605-*b*, the CRS resources 615-*b* fully overlap with REGb-2 of CCE 630-*c* within Symbol 1 of the PDCCH resources 610-*b*, and partially overlap with REGb-1 of CCE 630-*c* within Symbol 1 of the PDCCH resources 610-*b*. As such, according to the DMRS configuration 600, all PDCCH resources 610 within Symbol 2 may include DMRS resources 635 due to the fact that the CRS resources 615-*b* do not overlap with the PDCCH resources 610-*b* in Symbol 2. Moreover, according to the DMRS configuration 600, all the PDCCH resources 610 of REGb-0 may include DMRS resources 635 due to the fact that REGb-0 does not fully or partially overlap with the CRS resources 615-*b*.

Comparing the interleaved mapping configuration 605-*b* illustrated in FIG. 6 and the interleaved mapping configuration 505-*a* illustrated in FIG. 5, the result of the DMRS configurations 500 and 600 is the same for REGb-1 and REGb-2. However, the result of the DMRS configurations 500 and 600 is different for REGb-0. Specifically, the DMRS configuration 500 in FIG. 5 does not include DMRS resources 535 within the resources of REGb-0 within Symbol 1, whereas the DMRS configuration 600 in FIG. 6 does include DMRS resources 635 within the resources of REGb-0 within Symbol 1.

As shown in FIG. 6, the UE 115 may be configured to process, monitor, and/or decode different types of CCEs 630, where the different types of CCEs 630 differ in the degree, level, or amount of overlap with the CRS resources 615, and/or differ in format with respect to DMRS resources 635. For example, referring to the non-interleaved mapping configuration 605-*a*, the first CCE 630-*a* may exhibit a first type in that the entirety of the CCE 630-*a* includes DMRS resources 635, whereas the second CCE 630-*b* may exhibit a second type in that DMRS resources 635 are only present in Symbol 2 of the second CCE 630-*b*. Moreover, referring to the interleaved mapping configuration 605-*b*, the CCE 630-*c* may exhibit a third type in that some REG bundles (e.g., REGb-0) of the CCE 630-*c* include DMRS resources 635 throughout an entirety of the REG bundle, whereas other REG bundles (e.g., REGb-1, REGb-2) of the CCE 630-*c* only include DMRS resources 635 in Symbol 2 of the respective REG bundle.

When it comes to processing, monitoring, and/or decoding the different types of CCEs 630, the first type of CCE 630 (e.g., first CCE 630-*a*), the second type of CCE 630 (e.g., second CCE 630-*b*), and the third type of CCE 630 (e.g., CCE 630-*c*) may be treated the same or differently according to different implementations. In particular, the different types of CCEs 630 may be treated the same or differently with respect to a threshold quantity N of CCEs 630 the UE 115 is able to process, monitor, or decode (where the threshold quantity N of CCEs 630 may be configured at the UE 115 and/or signaled to the UE 115).

In accordance with a first implementation, the three types of CCEs 630 may be treated equally. For example, if the UE 115 is capable of processing a threshold quantity N of CCEs 630 within a given PDCCH monitoring occasion or slot, then the UE 115 may be able to totally process the threshold quantity N of CCEs 630 for all three types of CCEs 630 at a given PDCCH monitoring occasion or slot. In other words, the UE 115 may be able to process N quantity of a sum of CCEs 630 of the first type, the second type, and the third type. If there are more than N quantity of CCEs 630 including the first type, the second type, and/or the third type at a given PDCCH monitoring occasion, span, or slot, the UE 115 may not monitor one or some search space sets, so that the quantity does not exceed N.

In accordance with a second implementation, the three types of CCEs 630 may be treated differently, with separate blind decoding and/or CCE budgets for different types of CCEs 630. For example, the UE 115 may be capable of processing a first threshold quantity N1 of CCEs 630 of the first type within a given PDCCH monitoring occasion or slot, a second threshold quantity N2 of CCEs 630 of the second type within a given PDCCH monitoring occasion or slot, and a third threshold quantity N3 of CCEs 630 of the third type within a given PDCCH monitoring occasion or slot. In this example, the UE 115 may be able to process up to N1+N2+N3 quantity of CCEs 630, where N1+N2+N3 may be less than or equal to N representing a total quantity of CCEs 630 that the UE 115 is able to monitor within a given monitoring occasion or slot. If there are more than N1 quantity of CCEs 630 of the first type, more than N2 quantity of CCEs 630 of the second type, and/or more than N3 quantity of CCEs 630 of the third type at a given PDCCH monitoring occasion or span or slot, the UE 115 may not monitor one or some search space sets, so that the quantities do not exceed N1, N2, and N3, respectively.

In accordance with a third implementation, the second type of CCEs 630 (e.g., CCE630-*b*) and the third type of CCEs 630 (e.g., CCE 630-*c*) may be considered to be the same type for the purposes of processing CCEs 630 within a monitoring occasion or slot, and may therefore be counted together toward a threshold quantity N2 of CCEs 630 capable of being processed, monitored, or decoded.

Figure 7:
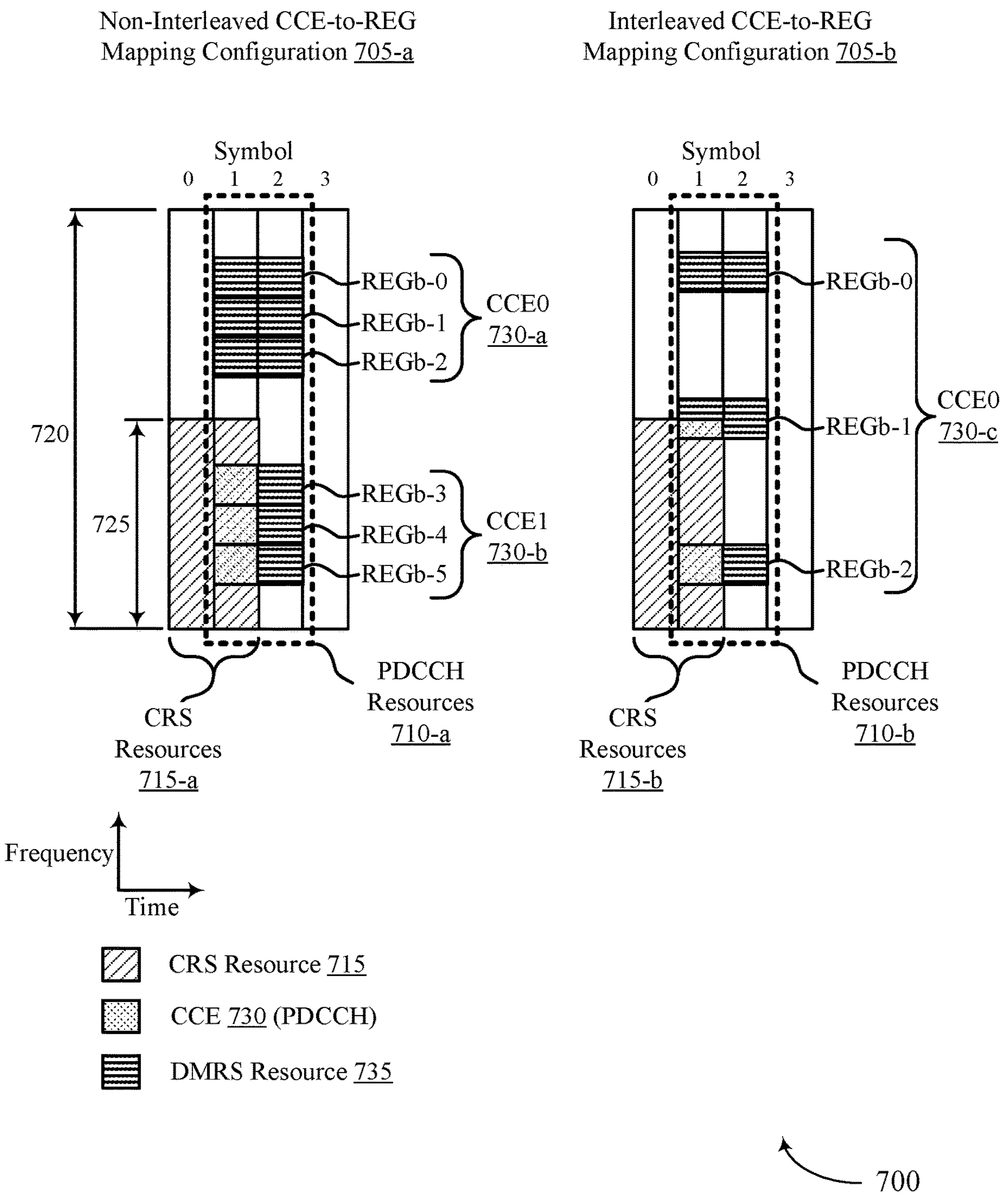

FIG. 7 illustrates an example of a DMRS configuration 700 that supports overlapping downlink control channel and CRS bandwidths in accordance with one or more aspects of the present disclosure. In some examples, aspects of the DMRS configuration 700 may implement, or be implemented by, aspects of the wireless communications system 100, the network architecture 200, the wireless communications system 300, or any combination thereof. In particular, the DMRS configuration 700 may enable DMRSs to be communicated on PDCCH resources associated with a first RAT that at least partially overlap with CRS resources associated with a second RAT, as described with reference to FIGS. 1-6, among other aspects.

The DMRS configuration 700 illustrates a non-interleaved CCE-to-REG mapping configuration 705-*a* and an interleaved CCE-to-REG mapping configuration 705-*b*. The mapping configurations 705-*a*, 705-*b* illustrate sets of resources including a sets of PDCCH resources 710-*a*, 710-*b*, and CRS resources 715-*a*, 715-*b*. The sets of PDCCH resources 710 may be associated with a first RAT, such as 5G, NR, or both. Comparatively, the CRS resources 715 may be associated with a second RAT, such as 4G, LTE, or both. In some aspects, the PDCCH resources 710 may be associated with a PDCCH bandwidth 720, and the CRS resources 715 may be associated with a CRS bandwidth 725. The DMRS configuration 700 illustrated in FIG. 7 depicts resources in the frequency domain along the y-axis, and depicts resources in the time domain along the x-axis.

As noted previously herein, a UE 115 may receive control signaling (e.g., RRC signaling) indicating a PDCCH configuration that includes or indicates the PDCCH resources 710, the PDCCH bandwidth 720, or both. Moreover, the PDCCH configuration may indicate or be associated with the non-interleaved CCE-to-REG mapping configuration 705-*a* or the interleaved CCE-to-REG mapping configuration 705-*b*. Similarly, the UE 115 may receive control signaling (e.g., RRC signaling) indicating a CRS configuration that includes or indicates the CRS resources 715, the CRS bandwidth 725, or both.

A PDCCH configuration (e.g., PDCCH resources 710) may include or be associated with a CORESET that spans one or more symbols in the frequency domain. For example, as shown in FIG. 4, PDCCH resources may span two symbols (e.g., Symbols 1 and 2) in the frequency domain. Referring to the non-interleaved mapping configuration 705-*a*, the PDCCH configuration may include a first CCE 730-*a* (CCE0) including REG bundles 0-2 (e.g., REGb 0-2) that are contiguous in the frequency domain, and a second CCE 730-*b* (CCE1) including REG bundles 3-5 that are contiguous in the frequency domain. Comparatively, referring to the interleaved mapping configuration 705-*b*, the PDCCH configuration may include a CCE 730-*c* (CCE0) including REG bundles 0-2 that are not contiguous in the frequency domain. In some cases, each REG bundle (e.g., REGb, or REGb-x) may span one resource block in the frequency domain and two symbols (e.g., two symbol periods) in the time domain. As shown in FIG. 7, each of the CCEs 730-*a*, 730-*b*, and 730-*c* may span Symbols 1 and 2 associated with the respective sets of PDCCH resources 710-*a*, 710-*b*. In some other cases, each REG bundle (e.g., REGb, or REGb-x) may span three resource blocks in the frequency domain and two symbols (e.g., two symbol periods) in the time domain, which is not shown in FIG. 7. In some aspects, a PDCCH candidate or monitoring occasion may include one or more CCEs 730.

In some cases, as shown in FIG. 7, the PDCCH bandwidth 720 (e.g., NR-PDCCH CORESET bandwidth) and the CRS bandwidth 725 (e.g., LTE CRS bandwidth) may at least partially overlap with one another. For example, referring to the non-interleaved mapping configuration 705-*a*, the CRS resources 715-*a* do not overlap with the first CCE 730-*a* of the PDCCH resources 710-*a*, but do overlap with the second CCE 730-*b* of the PDCCH resources 710-*a* on Symbol 1. By way of another example, referring to the interleaved mapping configuration 705-*b*, the CRS resources 715-*b* do not overlap with REGb-0 of the CCE 730-*c*, but partially and fully partially overlap with REGb-1 and REGb-2 of CCE 730-*c* on Symbol 1, respectively.

As noted previously herein, according to some conventional techniques, it may unclear whether (or to what extent) DMRSs are able to be transmitted on PDCCH resources 710 in cases where the PDCCH resources 710 overlap with the CRS resources 715, as shown in FIG. 6. In particular, according to some conventional techniques, is not clear how NR-PDCCH/DMRS is structured, and how the UE 115 is to perform channel estimation and decoding within the PDCCH resources 710.

Accordingly, the DMRS configuration 700 illustrates a resource configuration that enables DMRSs to be transmitted on PDCCH resources 710 that do not overlap with CRS resources 715. In particular, the DMRS configuration 700 illustrates a configuration that enables DMRS resources 735 to be implemented within PDCCH resources 710 on a per-sub-REG bundle basis, or per-fraction of a REG-basis. According to the DMRS configuration 700, the DMRS structure may apply for a fraction of a REG bundle in the frequency domain (e.g., subcarrier or resource element). That is, the DMRS structure applies to a fraction of REG bundle (e.g., subcarrier or resource element) that is not overlapping with CRS resources 715.

Stated differently, the DMRS configuration 700 may include DMRS resources 735 for any subcarrier or resource element in the frequency domain that does not overlap with the CRS resources 715.

For example, referring to the non-interleaved mapping configuration 705-*a*, the CRS resources 715-*a* partially overlap with the second CCE 730-*b* within Symbol 1 of the PDCCH resources 710-*a*, and do not overlap with the first CCE 730-*a*. The UE 115 and/or the network entity 105 may identify which PDCCH resources 510 include DMRS resources 535 based on the PDCCH configuration and the CRS configuration, and in accordance with the DMRS configuration. As such, according to the DMRS configuration 700, the first CCE 730-*a* may include DMRS resources 735 due to the first CCE 730-*a* not overlapping with the CRS resources 715-*a*. Additionally, according to the DMRS configuration 700, DMRS resources 735 may also include PDCCH resources 710 of the second CCE 730-*b* within Symbol 2 due to the resources of the second CCE 730-*b* in Symbol 2 not overlapping with the CRS resources 715-*a*. In this regard, the DMRS resources 735 may include each subcarrier or resource block of the PDCCH resources 710-*a* that does not overlap with the CRS resources 715-*a*.

Comparing the non-interleaved mapping configuration 705-*a* illustrated in FIG. 7 and the non-interleaved mapping configuration 605-*a* illustrated in FIG. 6, the result of the DMRS configurations 600 and 700 is the same for both the first CCEs 630-*a*, 730-*a* and the second CCEs 630-*b*, 730-*b*.

By way of another example, referring to the interleaved mapping configuration 705-*b*, the CRS resources 715-*b* fully overlap with REGb-2 of CCE 730-*c* within Symbol 1 of the PDCCH resources 710-*b*, and partially overlap with REGb-1 of CCE 730-*c* within Symbol 1 of the PDCCH resources 710-*b*. As such, according to the DMRS configuration 700, all PDCCH resources 710 within Symbol 2 may include DMRS resources 735 due to the fact that the CRS resources 715-*b* do not overlap with the PDCCH resources 710-*b* in Symbol 2. Moreover, according to the DMRS configuration 700, all the PDCCH resources 710 of REGb-0 may include DMRS resources 735 due to the fact that REGb-0 does not fully or partially overlap with the CRS resources 715-*b*. Further, the portion of the PDCCH resources 710 of REGb-1 that do not overlap with the CRS resources 715-*b* include DMRS resources 735. In this regard, the DMRS resources 735 may include each subcarrier or resource block of the PDCCH resources 710-*b* that does not overlap with the CRS resources 715-*b*.

Comparing the interleaved mapping configuration 705-*b* illustrated in FIG. 7 and the interleaved mapping configuration 605-*a* illustrated in FIG. 6, the result of the DMRS configurations 600 and 700 is the same for REGb-0 and REGb-2. However, the result of the DMRS configurations 600 and 700 is different for REGb-1. Specifically, the DMRS configuration 600 in FIG. 6 does not include DMRS resources 635 within the resources of REGb-1 within Symbol 1, whereas the DMRS configuration 700 in FIG. 7 include DMRS resources 735 within the portion of the resources of REGb-1 within Symbol 1 that do not overlap with the CRS resources 715-*b*.

As shown in FIG. 7, the UE 115 may be configured to process, monitor, and/or decode different types of CCEs 730, where the different types of CCEs 730 differ in the degree, level, or amount of overlap with the CRS resources 715, and/or differ in format with respect to DMRS resources 735. For example, referring to the non-interleaved mapping configuration 705-*a*, the first CCE 730-*a* may exhibit a first type in that the entirety of the CCE 730-*a* includes DMRS resources 735, whereas the second CCE 730-*b* may exhibit a second type in that DMRS resources 735 are only present in Symbol 2 of the second CCE 730-*b*. Moreover, the DMRS configuration 700 may, in some cases, result in the third type of CCE illustrated in the interleaved mapping configuration 605 illustrated in FIG. 6, where at least one REG bundle (REGb-0) includes DMRS resources 635 throughout an entirety of the REG bundle, and at least one REG bundle includes DMRS resources 635 in only Symbol 2. Further, referring to the interleaved mapping configuration 705-*b*, the CCE 730-*c* may exhibit a fourth type in that some REG bundles (e.g., REGb-0) of the CCE 730-*c* include DMRS resources 735 throughout an entirety of the REG bundle, other REG bundles (e.g., REGb-2) of the CCE 730-*c* only include DMRS resources 735 in Symbol 2 of the respective REG bundle, and other REG bundles (REGb-1) of the CCE 730-*c* include DMRS resources 735 in Symbol 2 and in a portion of Symbol 1 (e.g., CCE with a fraction of a REG/REG bundle in the frequency domain).

When it comes to processing, monitoring, and/or decoding the different types of CCEs 730, the first type of CCE 730 (e.g., first CCE 730-*a*), the second type of CCE 730 (e.g., second CCE 730-*b*), the third type of CCE 730 (e.g., CCE 630-*c* illustrated in FIG. 6), and the fourth type of CCE 730 (e.g., CCE 730-*c*) may be treated the same or differently according to different implementations. In particular, the different types of CCEs 730 may be treated the same or differently with respect to a threshold quantity N of CCEs 730 the UE 115 is able to process, monitor, or decode (where the threshold quantity N of CCEs 730 may be configured at the UE 115 and/or signaled to the UE 115).

In accordance with a first implementation, the fourth types of CCEs 730 may be treated equally. For example, if the UE 115 is capable of processing a threshold quantity N of CCEs 730 within a given PDCCH monitoring occasion or slot, then the UE 115 may be able to totally process the threshold quantity N of CCEs 730 for all four types of CCEs 730 at a given PDCCH monitoring occasion or slot. In other words, the UE 115 may be able to process N quantity of a sum of CCEs 530 of the first type, the second type, the third type, and the fourth type. If there are more than N quantity of CCEs 730 including the first type, the second type, the third type, and/or the fourth type at a given PDCCH monitoring occasion, span, or slot, the UE 115 may not monitor one or some search space sets, so that the quantity does not exceed N.

In accordance with a second implementation, the four types of CCEs 730 may be treated differently, with separate blind decoding and/or CCE budgets for different types of CCEs 730. For example, the UE 115 may be capable of processing a first threshold quantity N1 of CCEs 730 of the first type within a given PDCCH monitoring occasion or slot, a second threshold quantity N2 of CCEs 730 of the second type within a given PDCCH monitoring occasion or slot, a third threshold quantity N3 of CCEs 730 of the third type within a given PDCCH monitoring occasion or slot, and a fourth threshold quantity N4 of CCEs 730 of the fourth type within a given PDCCH monitoring occasion or slot. In this example, the UE 115 may be able to process up to N1+N2+N3+N4 quantity of CCEs 730, where N1+N2+N3 may be less than or equal to N representing a total quantity of CCEs 730 that the UE 115 is able to monitor within a given monitoring occasion or slot. If there are more than N1 quantity of CCEs 730 of the first type, more than N2 quantity of CCEs 730 of the second type, more than N3 quantity of CCEs 730 of the third type, and/or more than N4 quantity of CCEs 730 of the fourth type at a given PDCCH monitoring occasion or span or slot, the UE 115 may not monitor one or some search space sets, so that the quantities do not exceed N1, N2, N3, and N4, respectively.

In accordance with a third implementation, the second type of CCEs 730 (e.g., CCE730-*b*), the third type of CCEs 730 (e.g., CCE 630-*c* illustrated in FIG. 6), and the fourth type of CCEs 730 (e.g., CCE 730-*c*) may be considered to be the same type for the purposes of processing CCEs 730 within a monitoring occasion or slot, and may therefore be counted together toward a threshold quantity N2 of CCEs 730 capable of being processed, monitored, or decoded.

Figure 8:
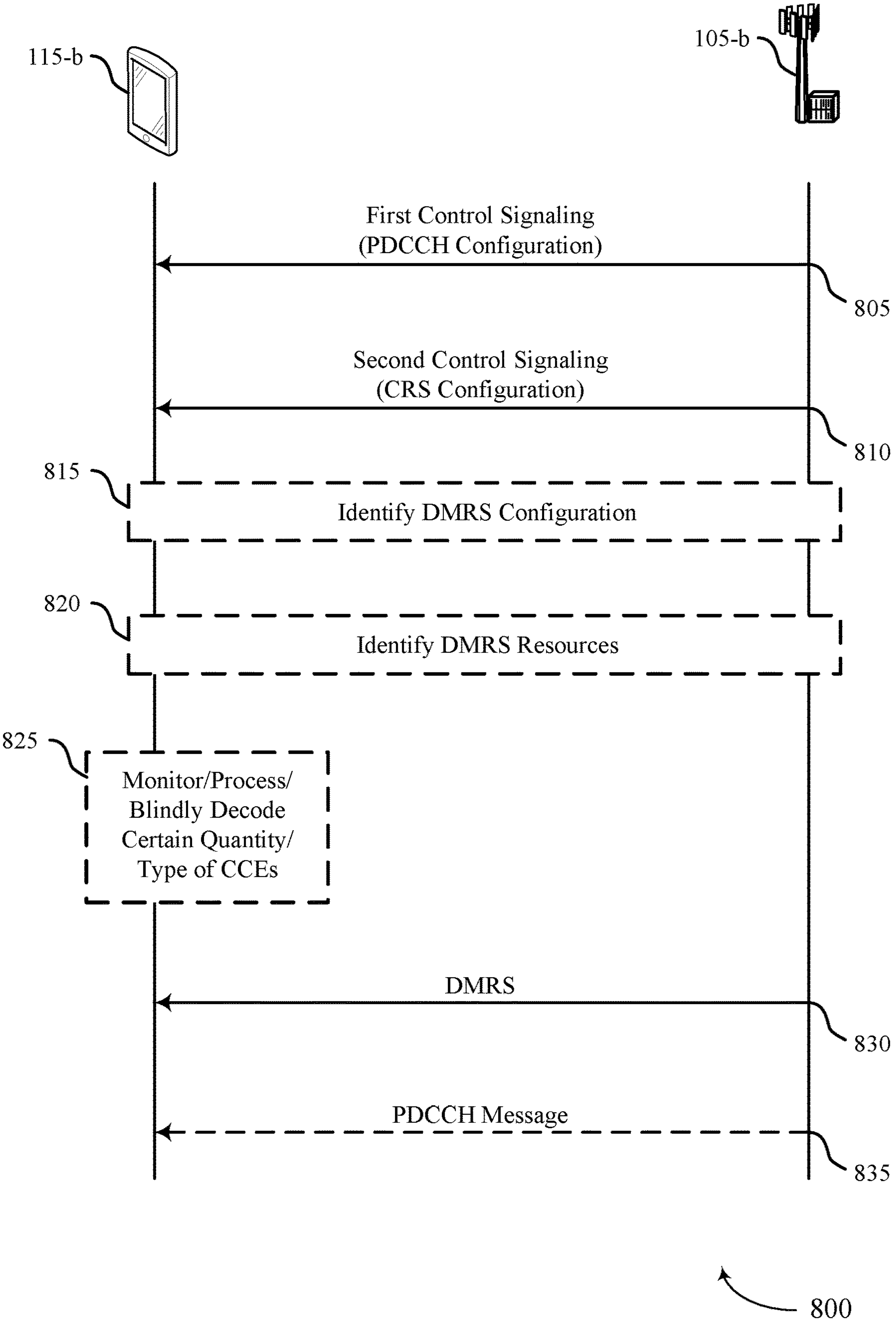
FIG. 8 illustrates an example of a process flow that supports overlapping downlink control channel and CRS bandwidths in accordance with one or more aspects of the present disclosure.

FIG. 8 illustrates an example of a process flow 800 that supports overlapping downlink control channel and CRS bandwidths in accordance with one or more aspects of the present disclosure. In some examples, aspects of the process flow 800 may implement, or be implemented by, aspects of the wireless communications system 100, the network architecture 200, the wireless communications system 300, the DMRS configurations 400-700, or any combination thereof.

The process flow 800 may include a UE 115-*b* and a network entity 105-*b*, which may be examples of UEs 115, network entities 105, and other wireless devices described with reference to FIGS. 1-7. For example, the UE 115-*b* and the network entity 105-*b* illustrated in FIG. 8 may include examples of the UE 115-*a* and the network entity 105-*a*, respectively, as illustrated in FIG. 3.

In some examples, the operations illustrated in process flow 800 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 805, the UE 115-*b* may receive first control signaling indicating a downlink control channel configuration (e.g., PDCCH configuration) associated with a first RAT. For example, the UE 115-*b* may receive first control signaling (e.g., RRC signaling) that indicates a PDCCH configuration associated with a 5G RAT and/or an NR access technology. The downlink control channel configuration may be associated with a non-interleaved mapping configuration or an interleaved mapping configuration, as illustrated in FIGS. 4-7. As shown previously herein, the downlink control channel configuration may indicate or be associated with a first set of time-frequency resources (e.g., PDCCH resources 410, 510, 610, and 710, as illustrated in FIGS. 4-7). Moreover, the first set of time-frequency resources may include one or more CCEs (e.g., CCEs 430, 530, 630, and 730, as illustrated in FIGS. 4-7).

At 810, the UE 115-*b* may receive second control signaling indicating a CRS configuration associated with a second RAT. In some cases, the UE 115-*b* may receive the second control signaling at 810 based on receiving the first control signaling at 805. For example, the UE 115-*b* may receive second control signaling (e.g., RRC signaling) that indicates a CRS configuration associated with a 4G RAT and/or an LTE RAT. As shown previously herein, the CRS configuration may indicate or be associated with a second set of time-frequency resources (e.g., CRS resources 415, 515, 615, and 715, as illustrated in FIGS. 4-7). Moreover, the second set of time-frequency resources may at least partially overlap with at least one CCE of the first set of time-frequency resources (e.g., PDCCH resources) of the downlink control channel configuration. That is, a CRS bandwidth may at least partially overlap with the PDCCH bandwidth.

While the first control signaling used to indicate the downlink control channel configuration and the second control signaling used to indicate the CRS configuration are shown and described as including separate signaling, this is not to be regarded as a limitation of the present disclosure. That is, in some cases, the first control signaling and the second control signaling may be the same. For example, in some implementations, the downlink control channel configuration and the CRS configuration may be indicated to the UE 115-*b* via a single RRC message.

In some implementations, the UE 115-*b* may expect to be configured with a PDCCH configuration such that that some of REG bundles or CCEs of the PDCCH configuration that the UE 115-*b* is expected to monitor overlap with CRS resources, where some other REG-bundles or CCEs do not overlap with CRS resources within a given PDCCH monitoring occasion. That is, the UE 115-*b* may expect to be configured with a PDCCH configuration and CRS configuration that cause all of the REG bundles/CCEs to at least partially overlap with the CRS resources, or that cause none of the REG bundles/CCEs to at least partially overlap with the CRS resources. In this regard, in some cases, the network entity 105-*b* may configure the downlink control channel configuration (e.g., NR-PDCCH configuration/CORESET) and/or CRS configuration such that the CORESET bandwidth (e.g., PDCCH bandwidth 420, 520, 620, 720) and the CRS bandwidth (e.g., CRS bandwidth 425, 525, 625, 725) fully overlap with one another, or do not overlap at all.

At 815, the UE 115-*b*, the network entity 105-*b*, or both, may identify a DMRS configuration that is to be used. In particular, the UE 115-*b* and/or the network entity 105-*b* may identify which DMRS configuration will be used to identify DMRS resources based on the downlink control channel configuration and the CRS configuration. In other words, the UE 115-*b*, the network entity 105-*b*, or both, may identify which of the DMRS configurations 400-700 illustrated in FIGS. 4-7 will be used to identify DMRS resources.

In some implementations, the network entity 105-*b* may indicate which DMRS configuration 400-700 is to be used or applied via the first control signaling at 805, via the second control signaling at 810, via additional control signaling (e.g., DCI, MAC-CE), or any combination thereof. In additional or alternative implementations, the UE 115-*b* may be configured (e.g., pre-configured) to use or apply one of the DMRS configurations 400-700, such as based on different time periods or based on the satisfaction of certain conditions.

At 820, the UE 115-*b*, the network entity 105-*b*, or both, may identify DMRS resources (e.g., a third set of time-frequency resources) that are to be used for receiving/transmitting DMRSs. In particular, the UE 115-*b* and/or the network entity 105-*b* may identify the DMRS resources based on the downlink control channel configuration and the CRS configuration, and in accordance with the identified DMRS configuration. In this regard, the UE 115-*b* and/or the network entity 105-*b* may identify the DMRS resources at 820 based on receiving/transmitting the first control signaling at 805, receiving/transmitting the second control signaling at 810, identifying the DMRS configuration at 815, or any combination thereof.

As shown and described in FIGS. 4-7, the UE 115-*b* and/or the network entity 105-*b* may identify the set of DMRS resources 435, 535, 635, 735 within the set of PDCCH resources 410, 510, 610, 710 in accordance with the DMRS configuration. In particular, the UE 115-*b* and/or the network entity 105-*b* may identify the DMRS resources within a portion of one or more CCEs 430, 530, 630, 730 of the PDCCH resources that does not overlap with the CRS resources 415, 515, 615, 715. The different DMRS configurations 400, 500, 600, 700 may cause the UE 115-*b* and/or the network entity 105-*b* to identify DMRS resources with varying granularities. For example, the DMRS configuration 400 illustrated in FIG. 4 may be used to identify DMRS resources on a per-CORESET basis, whereas the DMRS configuration 500 illustrated in FIG. 5 may be used to identify DMRS resources on a per-CCE basis. Moreover, the DMRS configuration 600 illustrated in FIG. 6 may be used to identify DMRS resources on a per-REG bundle basis, whereas the DMRS configuration 700 illustrated in FIG. 7 may be used to identify DMRS resources on a per-sub-REG bundle basis (e.g., per-fraction of a REG-bundle-basis).

At 825, the UE 115-*b* may monitor, process, and/or blindly decode certain quantities and/or types of CCEs of the first set of time-frequency resources of the downlink control channel configuration. The UE 115-*b* may perform the one or more processes at 825 based on receiving the first control signaling at 805, receiving the second control signaling at 810, identifying the DMRS configuration at 815, identifying the DMRS resources at 820, or any combination thereof.

For example, as described previously herein, different DMRS configurations may result in different types of CCEs, where the different types of CCEs may vary in a level or degree of overlap with CRS resources, and/or vary with respect to patterns of DMRS resources within the respective CCEs. For example, the DMRS configuration 400 illustrated in FIG. 4 may result in one type of CCE 430, whereas the DMRS configuration 500 illustrated in FIG. 5 may result in up to two different types of CCEs 530. Moreover, the DMRS configuration 600 illustrated in FIG. 6 may result in up to three different types of CCEs 630, and the DMRS configuration 700 illustrated in FIG. 7 may result in up to four different types of CCEs 730. As described previously herein, the different types of CCEs may be treated the same or differently with respect to how many CCEs the UE 115 is configured to process, monitor, and/or decode within a given monitoring occasion or slot. As such, the UE 115 may be configured to determine whether the UE 115 is to treat different type of CCEs the same or different from one another, and identify applicable threshold quantities of CCEs that the UE 115 is able or expected to process or monitor within a given monitoring occasion or slot.

At 830, the UE 115-*b* may receive, from the network entity 105-*b*, a DMRS within the third set of time-frequency resources (e.g., DMRS resources) that were identified at 820. In this regard, the UE 115-*b* may receive, and the network entity 105-*b* may transmit, the DMRS at 830 based on receiving/transmitting the first control signaling at 805, receiving/transmitting the second control signaling at 810, identifying the DMRS configuration at 815, identifying the DMRS resources at 820, monitoring/processing/decoding the certain quantity/type of CCEs at 825, or any combination thereof.

For example, the UE 115-*b* may receive the DMRS within the DMRS resources 435 illustrated in FIG. 4, within the DMRS resources 535 illustrated in FIG. 5, within the DMRS resources 635 illustrated in FIG. 6, and/or within the DMRS resources 735 illustrated in FIG. 7, and in accordance with the respective DMRS configurations 400, 500, 600, and 700. In this regard, the UE 115-*b* may receive the DMRS within a portion of the PDCCH resources that does not overlap with the CRS resources, as illustrated in FIGS. 4-7.

At 835, the UE 115-*b* may receive, from the network entity 105-*b*, a downlink control message (e.g., PDCCH message) within a portion of the PDCCH resources that is not allocated for DMRS. In particular, the UE 115-*b* may receive a downlink control message within a portion of the PDCCH resources that does not overlap with CRS resources, and that is not allocated for DMRS.

For example, referring to the non-interleaved mapping configuration 405-*a* illustrated in FIG. 4, the UE 115-*b* may receive a downlink control message (e.g., a non-DMRS control message) within Symbol 1 of the first CCE 430-*a*. Moreover, referring to the interleaved mapping configuration 405-*a* illustrated in FIG. 4, the UE 115-*b* may receive a downlink control message within Symbol 1 of REGb-0, and/or within a portion of Symbol 1 of REGb-1 (e.g., the portion that does not overlap with the CRS resources 415-*b*).

By way of another example, referring to the interleaved mapping configuration 505-*b* illustrated in FIG. 5, the UE 115-*b* may receive a downlink control message within Symbol 1 of REGb-0, and/or within a portion of Symbol 1 of REGb-1 (e.g., the portion that does not overlap with the CRS resources 515-*b*). Comparatively, referring to the non-interleaved mapping configuration 505-*a* illustrated in FIG. 5, because all PDCCH resources 510-*a* either overlap with the CRS resources 515-*a* or are allocated for DMRS resources 535, non-interleaved mapping configuration 505-*a* may not be used to transmit/receive other non-DMRS downlink control messages.

Techniques described herein may enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system. As such, by facilitating communication of DMRSs, aspects of the present disclosure may improve a reliability and efficiency of wireless communications within the wireless communications system.

Figure 9:
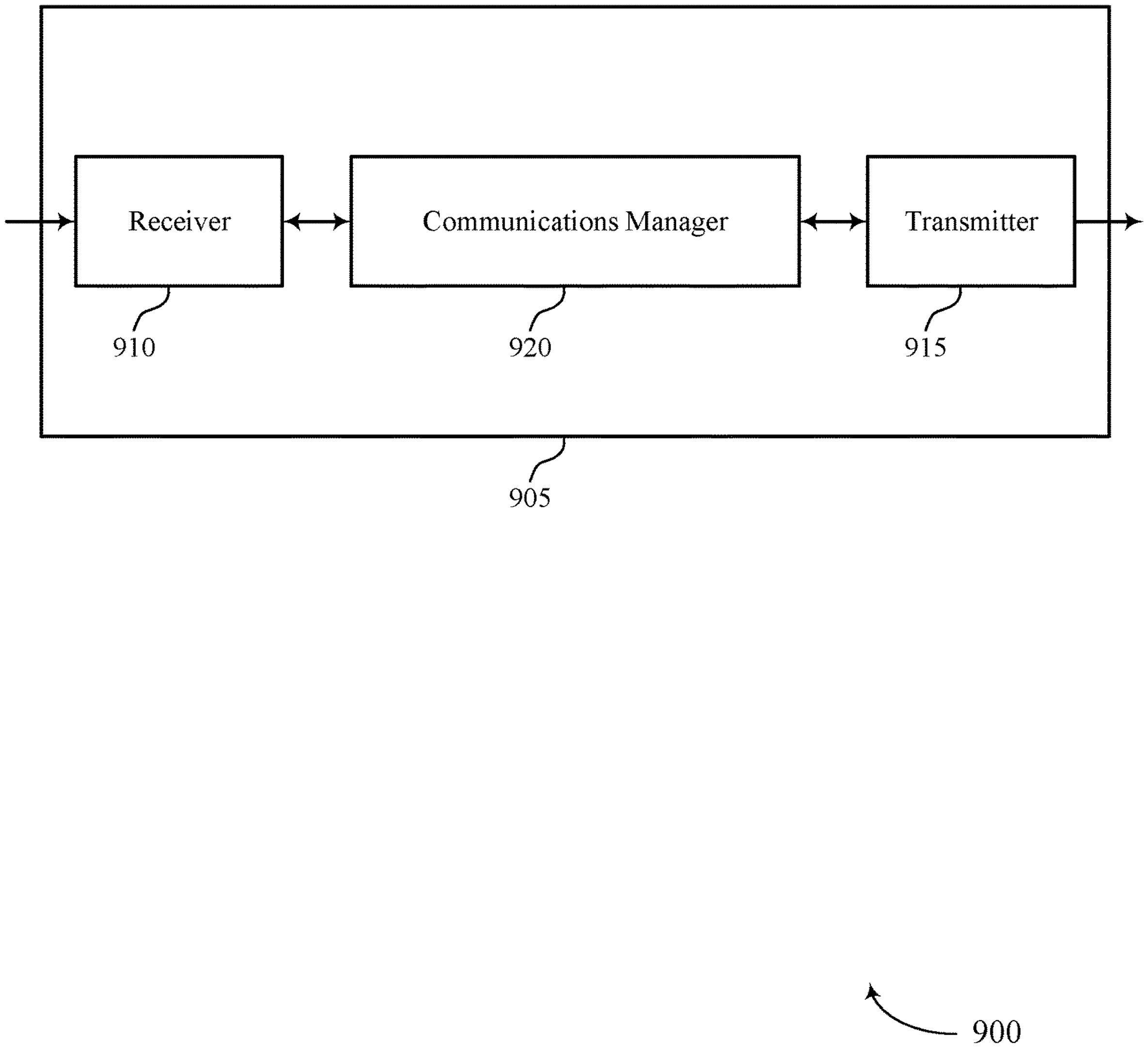
FIGS. 9 and 10 show block diagrams of devices that support overlapping downlink control channel and CRS bandwidths in accordance with one or more aspects of the present disclosure.

FIG. 9 shows a block diagram 900 of a device 905 that supports overlapping downlink control channel and CRS bandwidths in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to overlapping downlink control channel and CRS bandwidths). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to overlapping downlink control channel and CRS bandwidths). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of overlapping downlink control channel and CRS bandwidths as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a UE in accordance with examples as disclosed herein. For example, the communications manager 920 may be configured as or otherwise support a means for receiving first control signaling indicating a downlink control channel configuration associated with a first RAT, the downlink control channel configuration for a first set of time-frequency resources including one or more CCEs. The communications manager 920 may be configured as or otherwise support a means for receiving second control signaling indicating a CRS configuration associated with a second RAT, the CRS configuration for a second set of time-frequency resources that at least partially overlaps with at least one CCE of the one or more CCEs. The communications manager 920 may be configured as or otherwise support a means for receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system. As such, by facilitating communication of DMRSs, aspects of the present disclosure may improve a reliability and efficiency of wireless communications within the wireless communications system.

Figure 10:
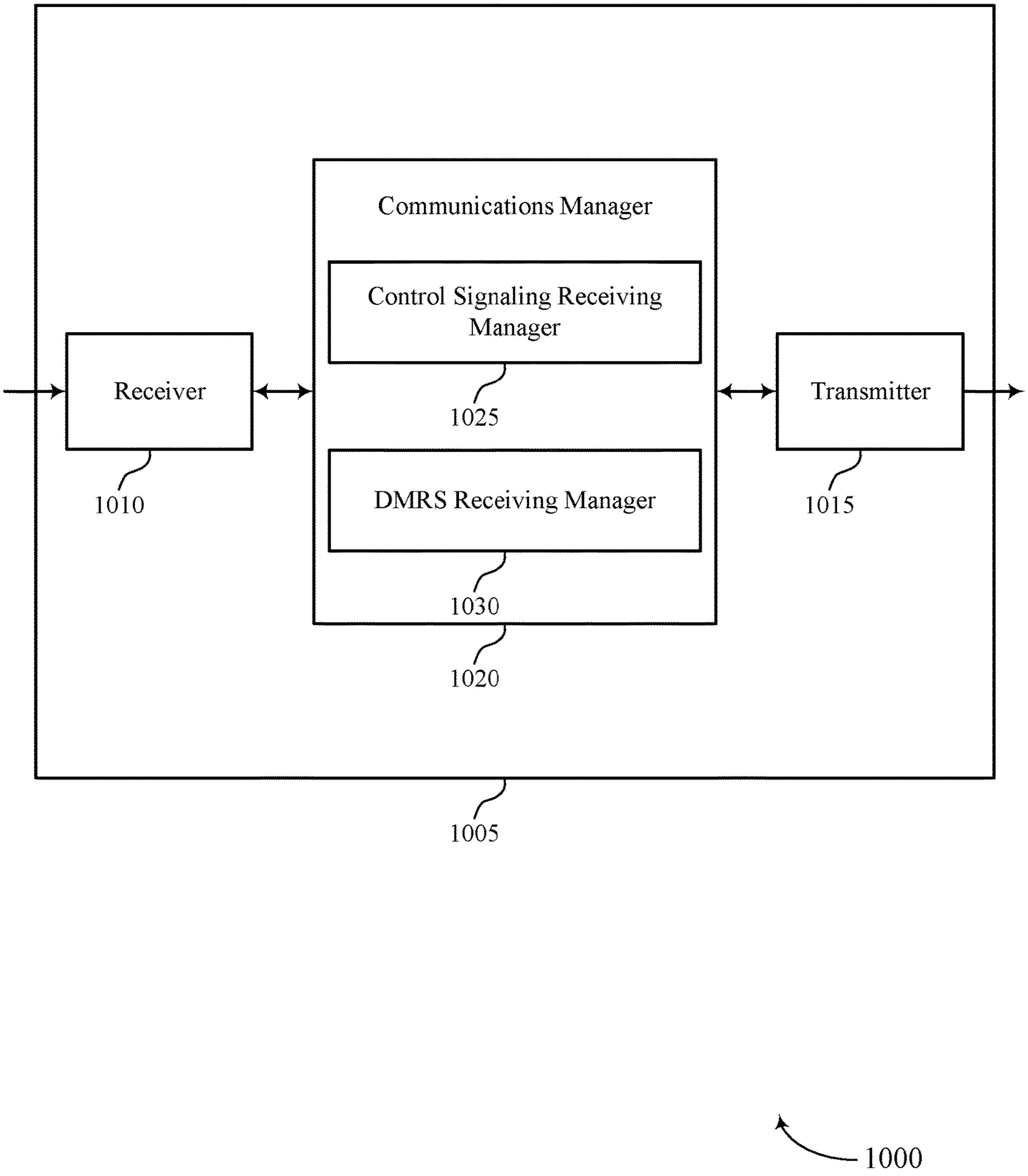

FIG. 10 shows a block diagram 1000 of a device 1005 that supports overlapping downlink control channel and CRS bandwidths in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to overlapping downlink control channel and CRS bandwidths). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to overlapping downlink control channel and CRS bandwidths). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of overlapping downlink control channel and CRS bandwidths as described herein. For example, the communications manager 1020 may include a control signaling receiving manager 1025 a DMRS receiving manager 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a UE in accordance with examples as disclosed herein. The control signaling receiving manager 1025 may be configured as or otherwise support a means for receiving first control signaling indicating a downlink control channel configuration associated with a first RAT, the downlink control channel configuration for a first set of time-frequency resources including one or more CCEs. The control signaling receiving manager 1025 may be configured as or otherwise support a means for receiving second control signaling indicating a CRS configuration associated with a second RAT, the CRS configuration for a second set of time-frequency resources that at least partially overlaps with at least one CCE of the one or more CCEs. The DMRS receiving manager 1030 may be configured as or otherwise support a means for receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

Figure 11:
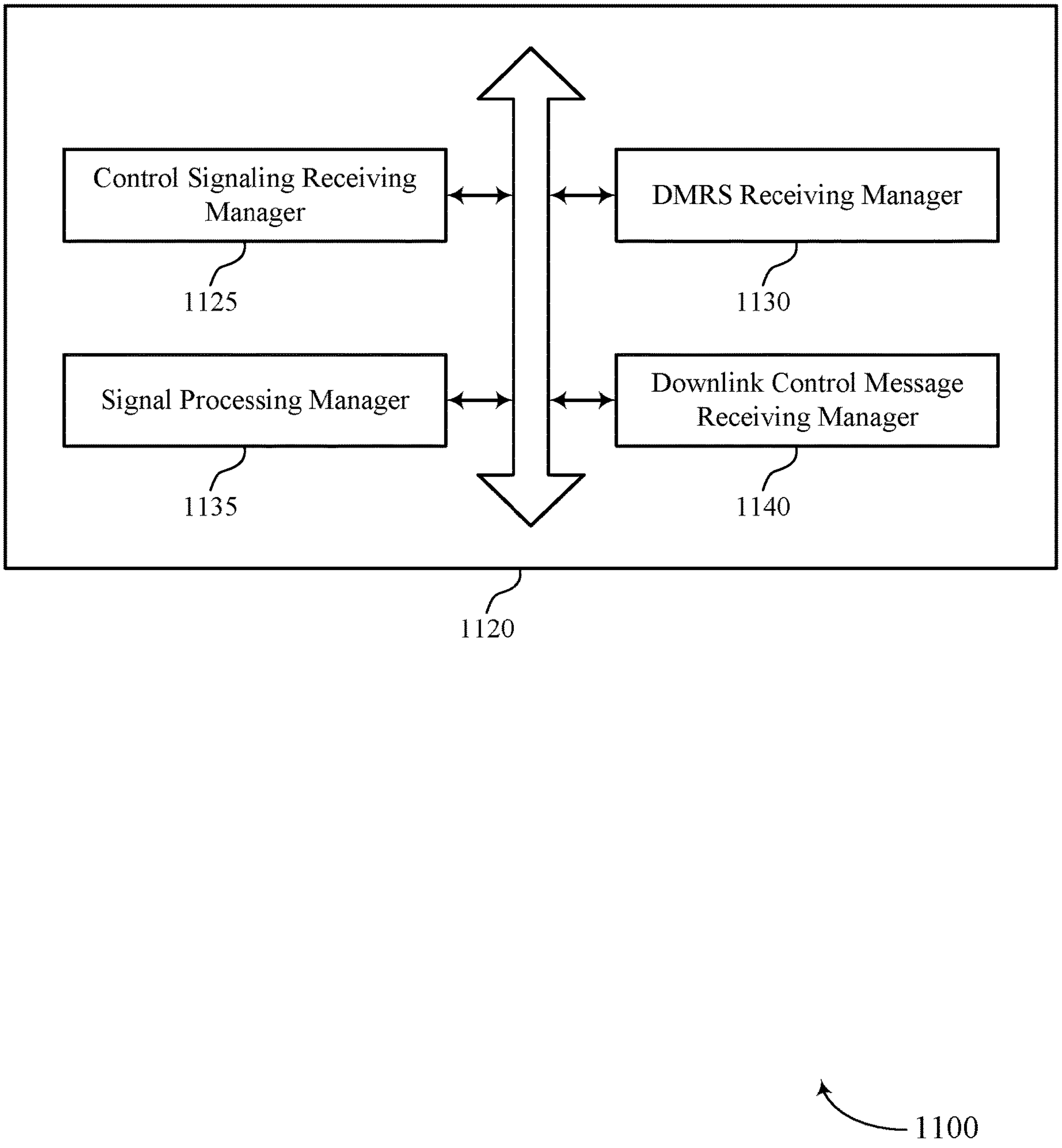
FIG. 11 shows a block diagram of a communications manager that supports overlapping downlink control channel and CRS bandwidths in accordance with one or more aspects of the present disclosure.

FIG. 11 shows a block diagram 1100 of a communications manager 1120 that supports overlapping downlink control channel and CRS bandwidths in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of overlapping downlink control channel and CRS bandwidths as described herein. For example, the communications manager 1120 may include a control signaling receiving manager 1125, a DMRS receiving manager 1130, a signal processing manager 1135, a downlink control message receiving manager 1140, or any combination thereof. Each of these components may communicate, directly or indirectly, with one another (e.g., via one or more buses).

The communications manager 1120 may support wireless communication at a UE in accordance with examples as disclosed herein. The control signaling receiving manager 1125 may be configured as or otherwise support a means for receiving first control signaling indicating a downlink control channel configuration associated with a first RAT, the downlink control channel configuration for a first set of time-frequency resources including one or more CCEs. In some examples, the control signaling receiving manager 1125 may be configured as or otherwise support a means for receiving second control signaling indicating a CRS configuration associated with a second RAT, the CRS configuration for a second set of time-frequency resources that at least partially overlaps with at least one CCE of the one or more CCEs. The DMRS receiving manager 1130 may be configured as or otherwise support a means for receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

In some examples, the one or more CCEs span at least a first symbol period and a second symbol period. In some examples, the second set of time-frequency resources of the CRS configuration at least partially overlaps with a first portion of the one or more CCEs within the first symbol period. In some examples, the third set of time-frequency resources include a second portion of the one or more CCEs within the second symbol period.

In some examples, the third set of time-frequency resources includes each time-frequency resource of the one or more CCEs within the second symbol period and excludes each time-frequency resource of the one or more CCEs within the first symbol period based on the second set of time-frequency resources of the CRS configuration overlapping with at least a portion of at least one CCE within the first symbol period.

In some examples, the one or more CCEs include a first CCE and a second CCE that span at least a first symbol period and a second symbol period. In some examples, the second set of time-frequency resources of the CRS configuration at least partially overlaps with a first portion of the first CCE in the first symbol period. In some examples, the third set of time-frequency resources include the second CCE and a second portion of the first CCE within the second symbol period.

In some examples, the one or more CCEs include a CCE including a first REG bundle and a second REG bundle that span at least a first symbol period and a second symbol period. In some examples, the second set of time-frequency resources of the CRS configuration at least partially overlaps with a first portion of the first REG bundle in the first symbol period. In some examples, the third set of time-frequency resources include the second REG bundle and a second portion of the first REG bundle within the second symbol period.

In some examples, the second set of time-frequency resources of the CRS configuration overlaps with a first subset of the first portion of the first REG bundle in the first symbol period. In some examples, the third set of time-frequency resources further include a second subset of the first portion of the first REG bundle in the first symbol period.

In some examples, the signal processing manager 1135 may be configured as or otherwise support a means for processing signals received within the one or more CCEs, where the one or more CCEs include a first set of CCEs of a first type and a second set of CCEs of a second type, where the first set of CCEs of the first type at least partially overlaps with the second set of time-frequency resources of the CRS configuration, and where the second set of CCEs of the second type does not overlap with the second set of time-frequency resources of the CRS configuration, where receiving the DMRS is based on the processing.

In some examples, the signal processing manager 1135 may be configured as or otherwise support a means for processing the signals received within a quantity of CCEs of the one or more CCEs within a monitoring occasion, a slot, or both, where the quantity of CCEs is less than or equal to a threshold quantity of CCEs of the first type and the second type that are capable of being processed by the UE.

In some examples, the signal processing manager 1135 may be configured as or otherwise support a means for processing the signals received within a first quantity of CCEs of the one or more CCEs within a monitoring occasion, a slot, or both, where the first quantity of CCEs is less than or equal to a first threshold quantity of CCEs of the first type that are capable of being processed by the UE. In some examples, the signal processing manager 1135 may be configured as or otherwise support a means for processing the signals received within a second quantity of CCEs of the one or more CCEs within the monitoring occasion, the slot, or both, where the second quantity of CCEs is less than or equal to a second threshold quantity of CCEs of the second type that are capable of being processed by the UE.

In some examples, the signal processing manager 1135 may be configured as or otherwise support a means for processing signals received within the one or more CCEs, where the one or more CCEs include a first set of CCEs of a first type, a second set of CCEs of a second type, and a third set of CCEs of a third type, where the first set of CCEs of the first type have a first level of overlap with the second set of time-frequency resources of the CRS configuration, where the second set of CCEs of the second type have a second level of overlap with the second set of time-frequency resources of the CRS configuration, and where the third set of CCEs of the third type do not overlap with the second set of time-frequency resources of the CRS configuration, where receiving the DMRS is based on the processing.

In some examples, to support processing the signals, the signal processing manager 1135 may be configured as or otherwise support a means for processing the signals received within a quantity of CCEs of the one or more CCEs within a monitoring occasion, a slot, or both, where the quantity of CCEs is less than or equal to a threshold quantity of CCEs of the first type, the second type, and the third type that are capable of being processed by the UE.

In some examples, to support processing the signals, the signal processing manager 1135 may be configured as or otherwise support a means for processing the signals received within a first quantity of CCEs of the one or more CCEs within a monitoring occasion, a slot, or both, where the first quantity of CCEs is less than or equal to a first threshold quantity of CCEs of the first type that are capable of being processed by the UE. In some examples, to support processing the signals, the signal processing manager 1135 may be configured as or otherwise support a means for processing the signals received within a second quantity of CCEs of the one or more CCEs within the monitoring occasion, the slot, or both, where the second quantity of CCEs is less than or equal to a second threshold quantity of CCEs of the second type that are capable of being processed by the UE. In some examples, to support processing the signals, the signal processing manager 1135 may be configured as or otherwise support a means for processing the signals received within a third quantity of CCEs of the one or more CCEs within the monitoring occasion, the slot, or both, where the third quantity of CCEs is less than or equal to a third threshold quantity of CCEs of the third type that are capable of being processed by the UE.

In some examples, to support processing the signals, the signal processing manager 1135 may be configured as or otherwise support a means for processing the signals received within a first quantity of CCEs of the one or more CCEs within a monitoring occasion, a slot, or both, where the first quantity of CCEs is less than or equal to a first threshold quantity of CCEs of the first type and the second type that are capable of being processed by the UE. In some examples, to support processing the signals, the signal processing manager 1135 may be configured as or otherwise support a means for processing the signals received within a second quantity of CCEs of the one or more CCEs within the monitoring occasion, the slot, or both, where the second quantity of CCEs is less than or equal to a second threshold quantity of CCEs of the second type that are capable of being processed by the UE.

In some examples, the downlink control message receiving manager 1140 may be configured as or otherwise support a means for receiving a downlink control message within a portion of the first set of time-frequency resources exclusive of the second set of time-frequency resources and the third set of time-frequency resources.

In some examples, the first RAT includes a 5G RAT, a NR access technology, or any combination thereof. In some examples, the second RAT includes a 4G RAT, an LTE RAT, or any combination thereof.

Figure 12:
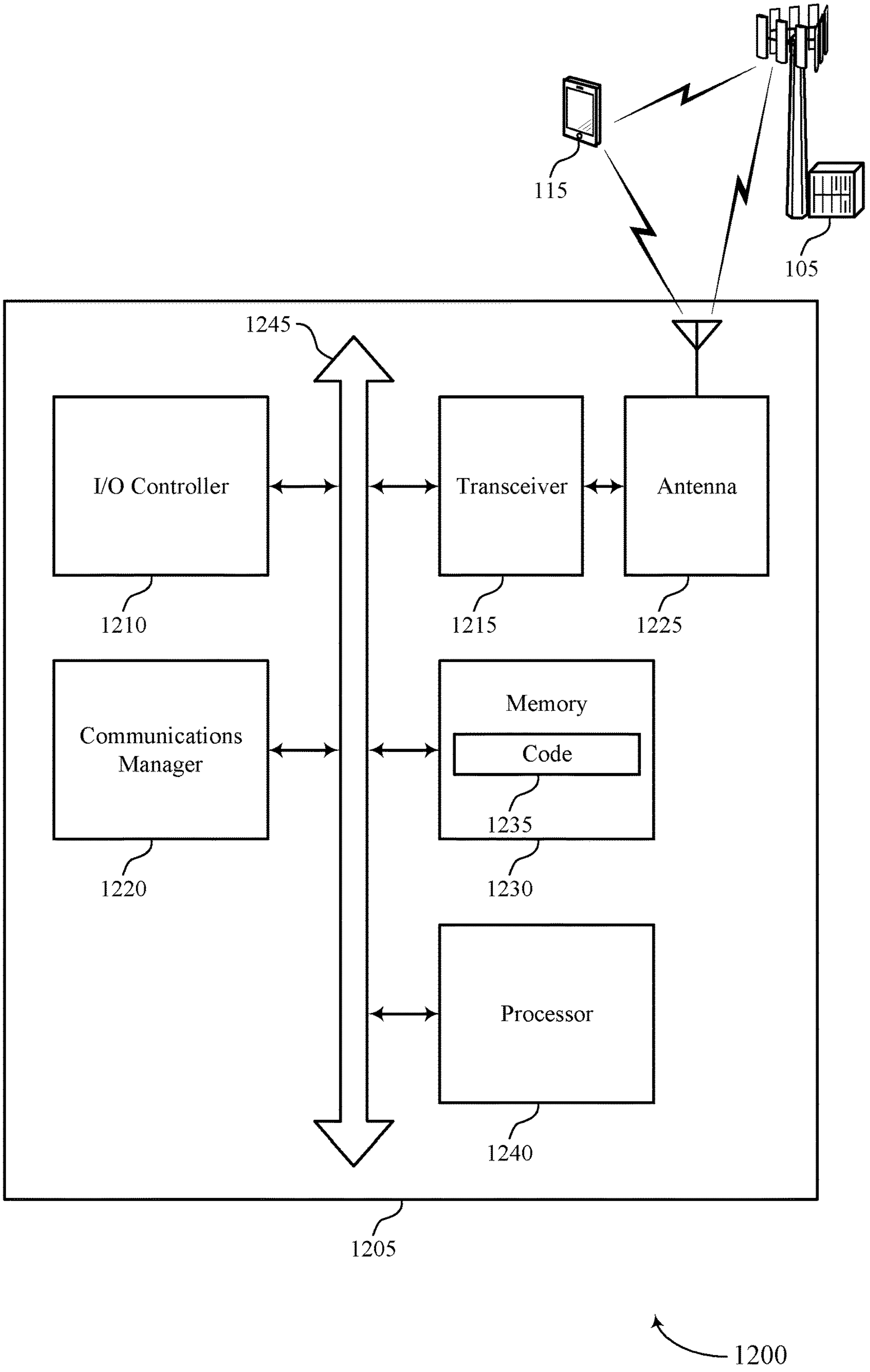
FIG. 12 shows a diagram of a system including a device that supports overlapping downlink control channel and CRS bandwidths in accordance with one or more aspects of the present disclosure.

FIG. 12 shows a diagram of a system 1200 including a device 1205 that supports overlapping downlink control channel and CRS bandwidths in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting overlapping downlink control channel and CRS bandwidths). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving first control signaling indicating a downlink control channel configuration associated with a first RAT, the downlink control channel configuration for a first set of time-frequency resources including one or more CCEs. The communications manager 1220 may be configured as or otherwise support a means for receiving second control signaling indicating a CRS configuration associated with a second RAT, the CRS configuration for a second set of time-frequency resources that at least partially overlaps with at least one CCE of the one or more CCEs. The communications manager 1220 may be configured as or otherwise support a means for receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

By including or configuring the communications manager 1220 in accordance with examples as described herein, the device 1205 may support techniques that enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system. As such, by facilitating communication of DMRSs, aspects of the present disclosure may improve a reliability and efficiency of wireless communications within the wireless communications system.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of overlapping downlink control channel and CRS bandwidths as described herein, or the processor 1240 and the memory 1230 may be otherwise configured to perform or support such operations.

Figure 13:
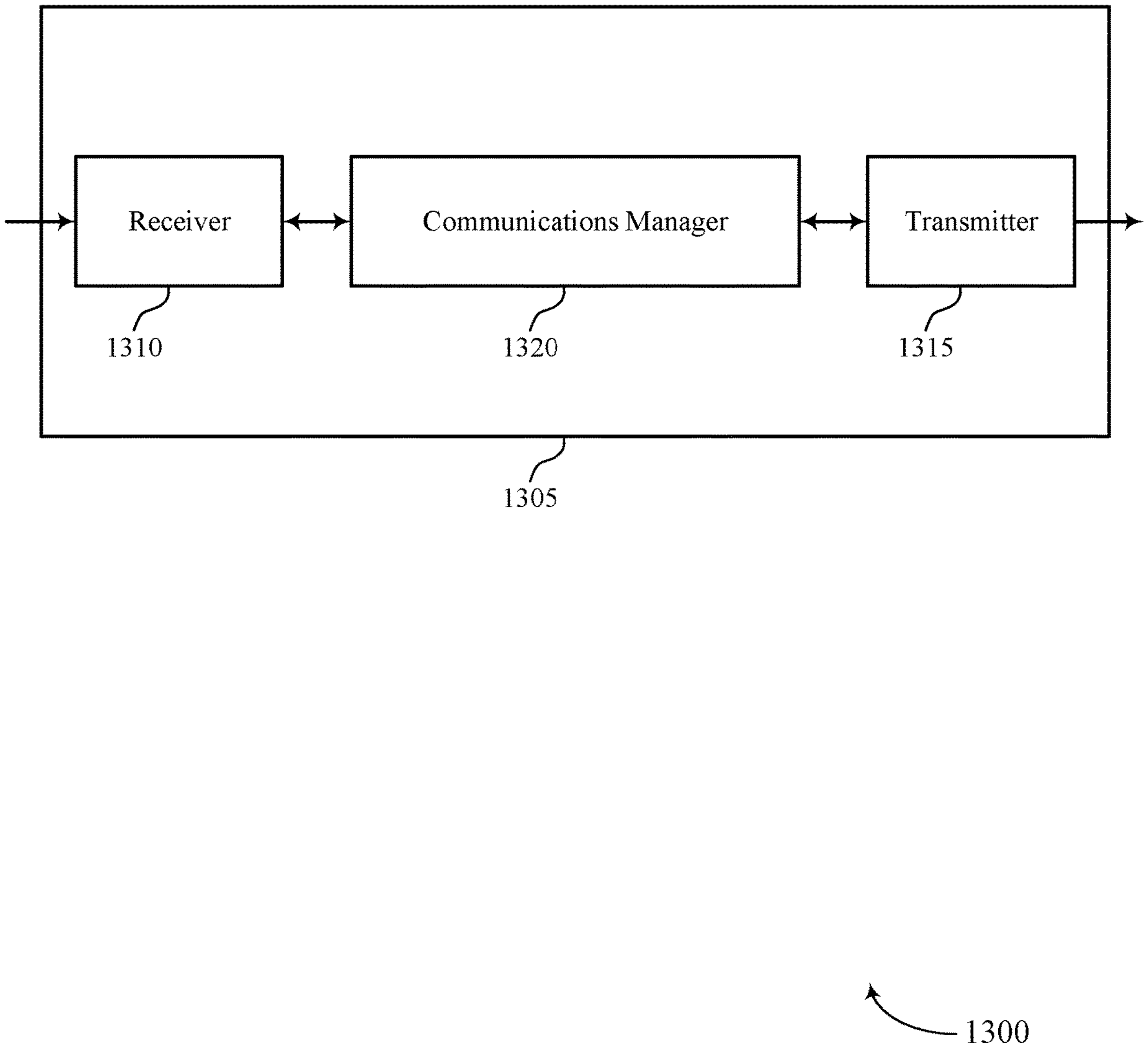
FIGS. 13 and 14 show block diagrams of devices that support overlapping downlink control channel and CRS bandwidths in accordance with one or more aspects of the present disclosure.

FIG. 13 shows a block diagram 1300 of a device 1305 that supports overlapping downlink control channel and CRS bandwidths in accordance with one or more aspects of the present disclosure. The device 1305 may be an example of aspects of a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of overlapping downlink control channel and CRS bandwidths as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a network entity in accordance with examples as disclosed herein. For example, the communications manager 1320 may be configured as or otherwise support a means for transmitting, to a UE, first control signaling indicating a downlink control channel configuration associated with a first RAT, the downlink control channel configuration for a first set of time-frequency resources including one or more CCEs. The communications manager 1320 may be configured as or otherwise support a means for transmitting, to the UE, second control signaling indicating a CRS configuration associated with a second RAT, the CRS configuration for a second set of time-frequency resources that at least partially overlaps with at least one CCE of the one or more CCEs. The communications manager 1320 may be configured as or otherwise support a means for transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

By including or configuring the communications manager 1320 in accordance with examples as described herein, the device 1305 (e.g., a processor controlling or otherwise coupled with the receiver 1310, the transmitter 1315, the communications manager 1320, or a combination thereof) may support techniques that enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system. As such, by facilitating communication of DMRSs, aspects of the present disclosure may improve a reliability and efficiency of wireless communications within the wireless communications system.

Figure 14:
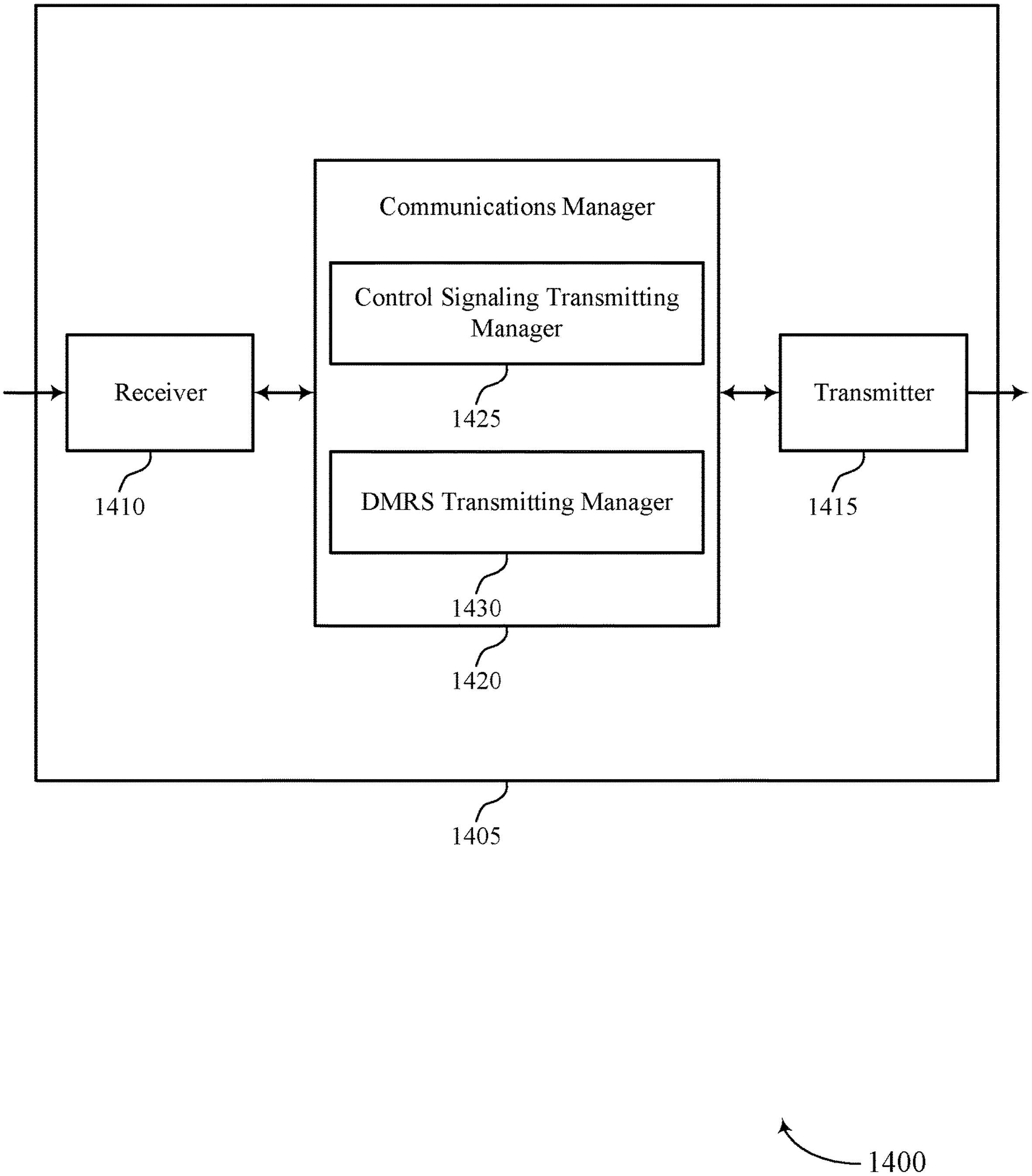

FIG. 14 shows a block diagram 1400 of a device 1405 that supports overlapping downlink control channel and CRS bandwidths in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of overlapping downlink control channel and CRS bandwidths as described herein. For example, the communications manager 1420 may include a control signaling transmitting manager 1425 a DMRS transmitting manager 1430, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication at a network entity in accordance with examples as disclosed herein. The control signaling transmitting manager 1425 may be configured as or otherwise support a means for transmitting, to a UE, first control signaling indicating a downlink control channel configuration associated with a first RAT, the downlink control channel configuration for a first set of time-frequency resources including one or more CCEs. The control signaling transmitting manager 1425 may be configured as or otherwise support a means for transmitting, to the UE, second control signaling indicating a CRS configuration associated with a second RAT, the CRS configuration for a second set of time-frequency resources that at least partially overlaps with at least one CCE of the one or more CCEs. The DMRS transmitting manager 1430 may be configured as or otherwise support a means for transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

Figure 15:
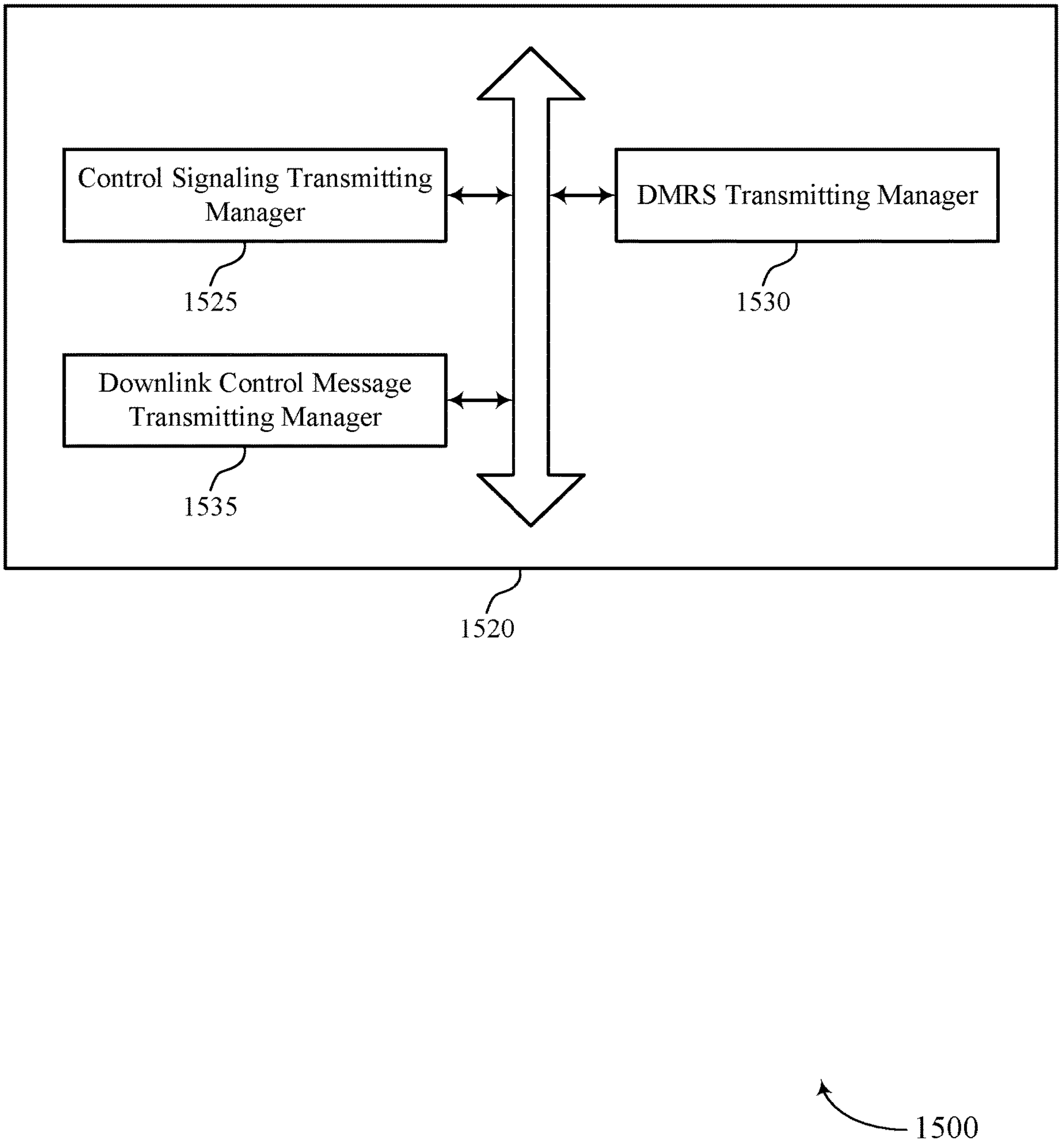
FIG. 15 shows a block diagram of a communications manager that supports overlapping downlink control channel and CRS bandwidths in accordance with one or more aspects of the present disclosure.

FIG. 15 shows a block diagram 1500 of a communications manager 1520 that supports overlapping downlink control channel and CRS bandwidths in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of overlapping downlink control channel and CRS bandwidths as described herein. For example, the communications manager 1520 may include a control signaling transmitting manager 1525, a DMRS transmitting manager 1530, a downlink control message transmitting manager 1535, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication at a network entity in accordance with examples as disclosed herein. The control signaling transmitting manager 1525 may be configured as or otherwise support a means for transmitting, to a UE, first control signaling indicating a downlink control channel configuration associated with a first RAT, the downlink control channel configuration for a first set of time-frequency resources including one or more CCEs. In some examples, the control signaling transmitting manager 1525 may be configured as or otherwise support a means for transmitting, to the UE, second control signaling indicating a CRS configuration associated with a second RAT, the CRS configuration for a second set of time-frequency resources that at least partially overlaps with at least one CCE of the one or more CCEs. The DMRS transmitting manager 1530 may be configured as or otherwise support a means for transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

In some examples, the one or more CCEs span at least a first symbol period and a second symbol period. In some examples, the second set of time-frequency resources of the CRS configuration at least partially overlaps with a first portion of the one or more CCEs within the first symbol period. In some examples, the third set of time-frequency resources include a second portion of the one or more CCEs within the second symbol period.

In some examples, the third set of time-frequency resources includes each time-frequency resource of the one or more CCEs within the second symbol period and excludes each time-frequency resource of the one or more CCEs within the first symbol period based on the second set of time-frequency resources of the CRS configuration overlapping with at least a portion of at least one CCE within the first symbol period.

In some examples, the one or more CCEs include a first CCE and a second CCE that span at least a first symbol period and a second symbol period. In some examples, the second set of time-frequency resources of the CRS configuration at least partially overlaps with a first portion of the first CCE in the first symbol period. In some examples, the third set of time-frequency resources include the second CCE and a second portion of the first CCE within the second symbol period.

In some examples, the one or more CCEs include a CCE including a first REG bundle and a second REG bundle that span at least a first symbol period and a second symbol period. In some examples, the second set of time-frequency resources of the CRS configuration at least partially overlaps with a first portion of the first REG bundle in the first symbol period. In some examples, the third set of time-frequency resources include the second REG bundle and a second portion of the first REG bundle within the second symbol period.

In some examples, the second set of time-frequency resources of the CRS configuration overlaps with a first subset of the first portion of the first REG bundle in the first symbol period. In some examples, the third set of time-frequency resources further include a second subset of the first portion of the first REG bundle in the first symbol period.

In some examples, the downlink control message transmitting manager 1535 may be configured as or otherwise support a means for transmitting a downlink control message to the UE within a portion of the first set of time-frequency resources exclusive of the second set of time-frequency resources and the third set of time-frequency resources.

Figure 16:
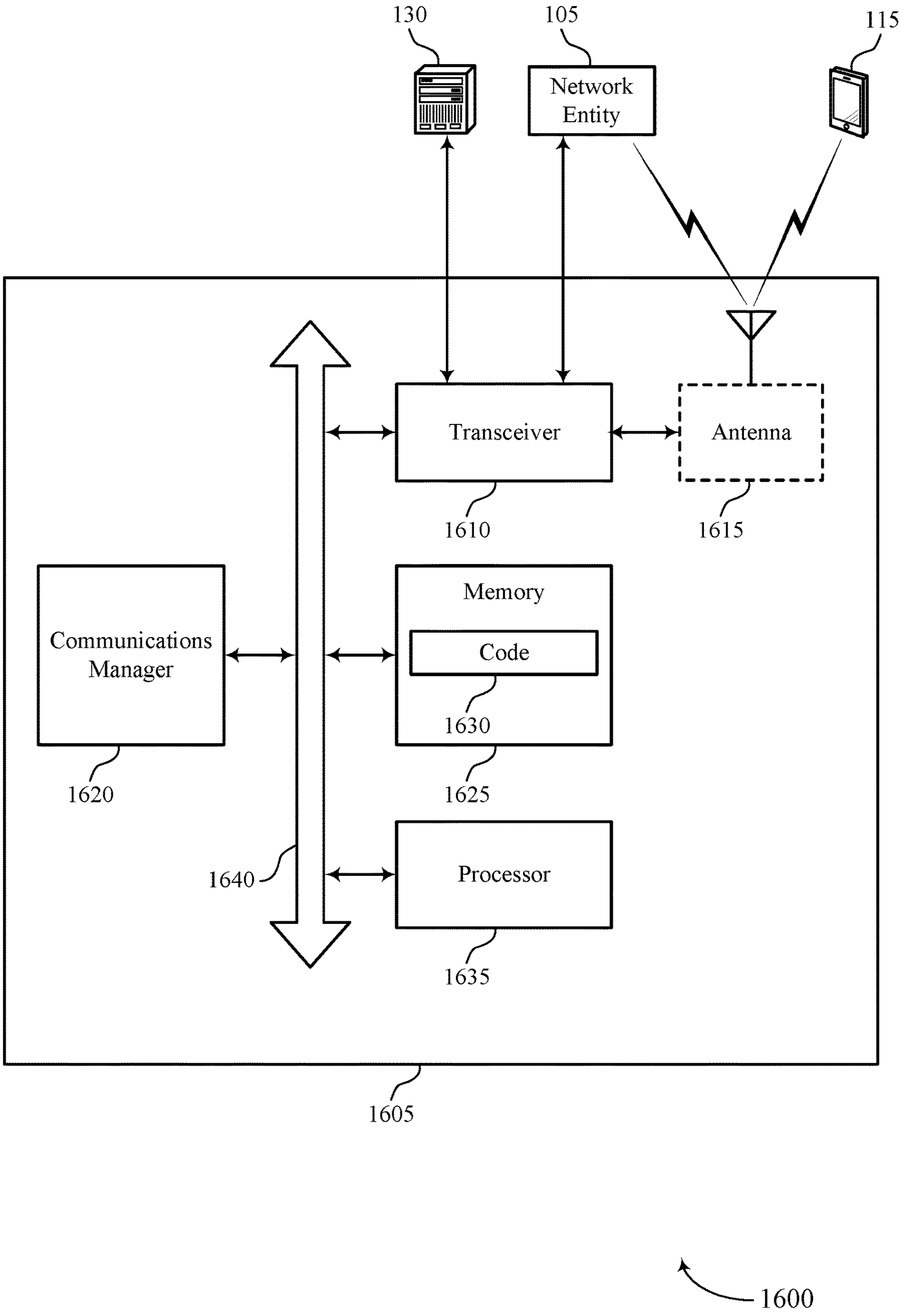
FIG. 16 shows a diagram of a system including a device that supports overlapping downlink control channel and CRS bandwidths in accordance with one or more aspects of the present disclosure.

FIG. 16 shows a diagram of a system 1600 including a device 1605 that supports overlapping downlink control channel and CRS bandwidths in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, a memory 1625, code 1630, and a processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or memory components (for example, the processor 1635, or the memory 1625, or both), may be included in a chip or chip assembly that is installed in the device 1605. The transceiver 1610, or the transceiver 1610 and one or more antennas 1615 or wired interfaces, where applicable, may be an example of a transmitter 1315, a transmitter 1415, a receiver 1310, a receiver 1410, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1625 may include RAM and ROM. The memory 1625 may store computer-readable, computer-executable code 1630 including instructions that, when executed by the processor 1635, cause the device 1605 to perform various functions described herein. The code 1630 may be stored in a non-transitory computer-readable medium such as system memory or another type of memory. In some cases, the code 1630 may not be directly executable by the processor 1635 but may cause a computer (e.g., when compiled and executed) to perform functions described herein. In some cases, the memory 1625 may contain, among other things, a BIOS which may control basic hardware or software operation such as the interaction with peripheral components or devices.

The processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1635 may be configured to operate a memory array using a memory controller. In some other cases, a memory controller may be integrated into the processor 1635. The processor 1635 may be configured to execute computer-readable instructions stored in a memory (e.g., the memory 1625) to cause the device 1605 to perform various functions (e.g., functions or tasks supporting overlapping downlink control channel and CRS bandwidths). For example, the device 1605 or a component of the device 1605 may include a processor 1635 and memory 1625 coupled with the processor 1635, the processor 1635 and memory 1625 configured to perform various functions described herein. The processor 1635 may be an example of a cloud-computing platform (e.g., one or more physical nodes and supporting software such as operating systems, virtual machines, or container instances) that may host the functions (e.g., by executing code 1630) to perform the functions of the device 1605. The processor 1635 may be any one or more suitable processors capable of executing scripts or instructions of one or more software programs stored in the device 1605 (such as within the memory 1625). In some implementations, the processor 1635 may be a component of a processing system. A processing system may generally refer to a system or series of machines or components that receives inputs and processes the inputs to produce a set of outputs (which may be passed to other systems or components of, for example, the device 1605). For example, a processing system of the device 1605 may refer to a system including the various other components or subcomponents of the device 1605, such as the processor 1635, or the transceiver 1610, or the communications manager 1620, or other components or combinations of components of the device 1605. The processing system of the device 1605 may interface with other components of the device 1605, and may process information received from other components (such as inputs or signals) or output information to other components. For example, a chip or modem of the device 1605 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1605 may transmit information output from the chip or modem. In some implementations, the second interface may refer to an interface between the processing system of the chip or modem and a receiver, such that the device 1605 may obtain information or signal inputs, and the information may be passed to the processing system. A person having ordinary skill in the art will readily recognize that the first interface also may obtain information or signal inputs, and the second interface also may output information or signal outputs.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the memory 1625, the code 1630, and the processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication at a network entity in accordance with examples as disclosed herein. For example, the communications manager 1620 may be configured as or otherwise support a means for transmitting, to a UE, first control signaling indicating a downlink control channel configuration associated with a first RAT, the downlink control channel configuration for a first set of time-frequency resources including one or more CCEs. The communications manager 1620 may be configured as or otherwise support a means for transmitting, to the UE, second control signaling indicating a CRS configuration associated with a second RAT, the CRS configuration for a second set of time-frequency resources that at least partially overlaps with at least one CCE of the one or more CCEs. The communications manager 1620 may be configured as or otherwise support a means for transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources.

By including or configuring the communications manager 1620 in accordance with examples as described herein, the device 1605 may support techniques that enable DMRSs to be communicated within PDCCH resources that at least partially overlap with CRS resources. In particular, aspects of the present disclosure may enable DMRSs to be transmitted within PDCCH resources associated with a first RAT (e.g., 5G, NR) in cases where the PDCCH resources are "punctured" by CRS resources associated with a second RAT (e.g., 4G, LTE). In this regard, aspects of the present disclosure may preserve use of PDCCH resources even in cases where the PDCCH resources conflict with (e.g., overlap) resources of a different RAT, thereby facilitating communication of DMRSs and improving resource utilization within the wireless communications system. As such, by facilitating communication of DMRSs, aspects of the present disclosure may improve a reliability and efficiency of wireless communications within the wireless communications system.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the processor 1635, the memory 1625, the code 1630, the transceiver 1610, or any combination thereof. For example, the code 1630 may include instructions executable by the processor 1635 to cause the device 1605 to perform various aspects of overlapping downlink control channel and CRS bandwidths as described herein, or the processor 1635 and the memory 1625 may be otherwise configured to perform or support such operations.

FIG. 17 shows a flowchart illustrating a method 1700 that supports overlapping downlink control channel and CRS bandwidths in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving first control signaling indicating a downlink control channel configuration associated with a first RAT, the downlink control channel configuration for a first set of time-frequency resources including one or more CCEs. The operations of 1705 may be performed in accordance with examples as disclosed herein. In some examples, aspects of the operations of 1705 may be performed by a control signaling receiving manager 1125 as described with reference to FIG. 11.

At 1710, the method may include receiving second control signaling indicating a CRS configuration associated with a second RAT, the CRS configuration for a second set of time-frequency resources that at least partially overlaps with at least one CCE of the one or more CCEs. The operations of 1710 may be performed in accordance with examples as disclosed herein. In some examples, aspects of the operations of 1710 may be performed by a control signaling receiving manager 1125 as described with reference to FIG. 11.

At 1715, the method may include receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources. The operations of 1715 may be performed in accordance with examples as disclosed herein. In some examples, aspects of the operations of 1715 may be performed by a DMRS receiving manager 1130 as described with reference to FIG. 11.

Figure 18:
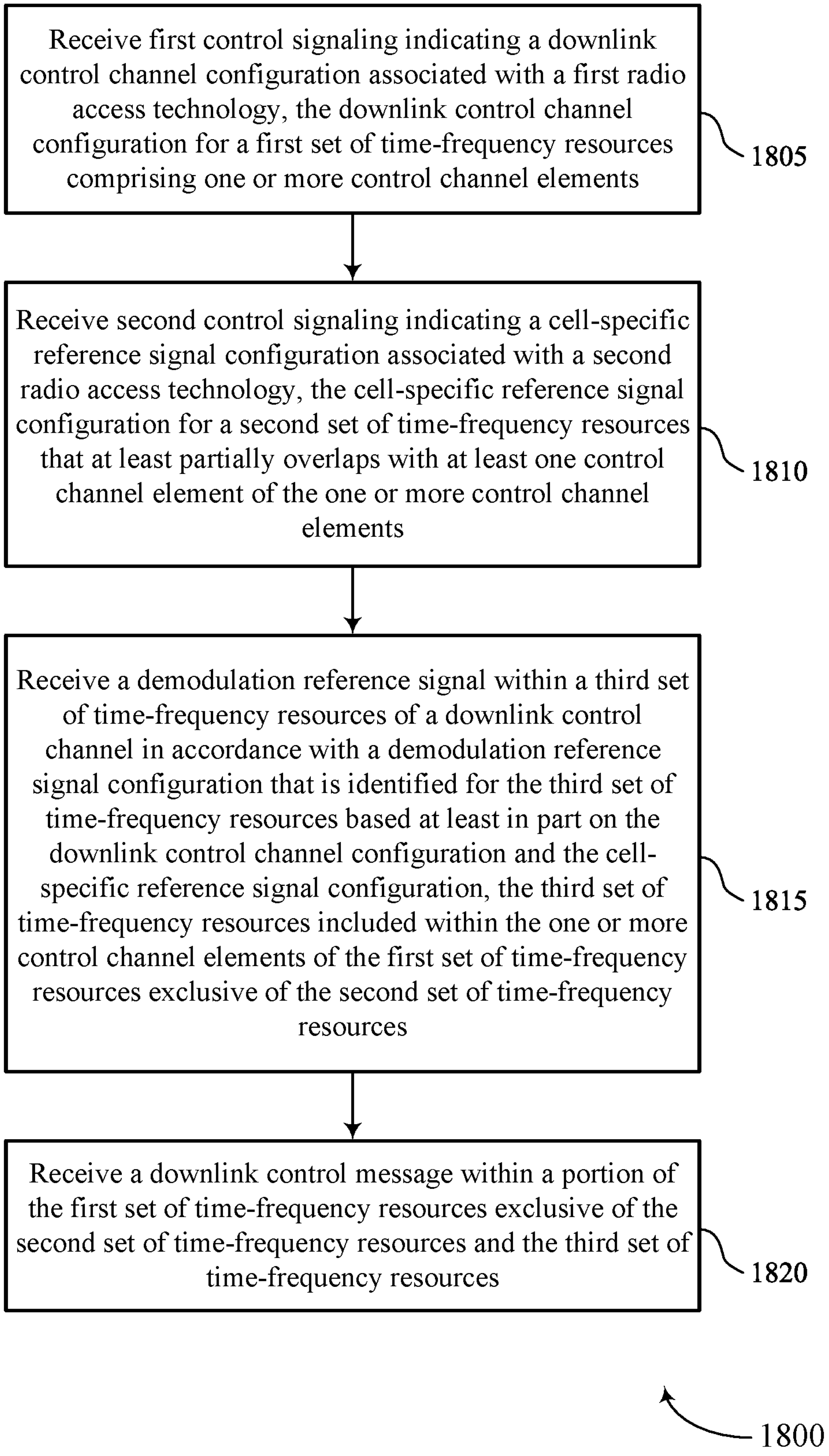

FIG. 18 shows a flowchart illustrating a method 1800 that supports overlapping downlink control channel and CRS bandwidths in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving first control signaling indicating a downlink control channel configuration associated with a first RAT, the downlink control channel configuration for a first set of time-frequency resources including one or more CCEs. The operations of 1805 may be performed in accordance with examples as disclosed herein. In some examples, aspects of the operations of 1805 may be performed by a control signaling receiving manager 1125 as described with reference to FIG. 11.

At 1810, the method may include receiving second control signaling indicating a CRS configuration associated with a second RAT, the CRS configuration for a second set of time-frequency resources that at least partially overlaps with at least one CCE of the one or more CCEs. The operations of 1810 may be performed in accordance with examples as disclosed herein. In some examples, aspects of the operations of 1810 may be performed by a control signaling receiving manager 1125 as described with reference to FIG. 11.

At 1815, the method may include receiving a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources. The operations of 1815 may be performed in accordance with examples as disclosed herein. In some examples, aspects of the operations of 1815 may be performed by a DMRS receiving manager 1130 as described with reference to FIG. 11.

At 1820, the method may include receiving a downlink control message within a portion of the first set of time-frequency resources exclusive of the second set of time-frequency resources and the third set of time-frequency resources. The operations of 1820 may be performed in accordance with examples as disclosed herein. In some examples, aspects of the operations of 1820 may be performed by a downlink control message receiving manager 1140 as described with reference to FIG. 11.

FIG. 19 shows a flowchart illustrating a method 1900 that supports overlapping downlink control channel and CRS bandwidths in accordance with one or more aspects of the present disclosure. The operations of the method 1900 may be implemented by a network entity or its components as described herein. For example, the operations of the method 1900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 1905, the method may include transmitting, to a UE, first control signaling indicating a downlink control channel configuration associated with a first RAT, the downlink control channel configuration for a first set of time-frequency resources including one or more CCEs. The operations of 1905 may be performed in accordance with examples as disclosed herein. In some examples, aspects of the operations of 1905 may be performed by a control signaling transmitting manager 1525 as described with reference to FIG. 15.

At 1910, the method may include transmitting, to the UE, second control signaling indicating a CRS configuration associated with a second RAT, the CRS configuration for a second set of time-frequency resources that at least partially overlaps with at least one CCE of the one or more CCEs. The operations of 1910 may be performed in accordance with examples as disclosed herein. In some examples, aspects of the operations of 1910 may be performed by a control signaling transmitting manager 1525 as described with reference to FIG. 15.

At 1915, the method may include transmitting, to the UE, a DMRS within a third set of time-frequency resources of a downlink control channel in accordance with a DMRS configuration that is identified for the third set of time-frequency resources based on the downlink control channel configuration and the CRS configuration, the third set of time-frequency resources included within the one or more CCEs of the first set of time-frequency resources exclusive of the second set of time-frequency resources. The operations of 1915 may be performed in accordance with examples as disclosed herein. In some examples, aspects of the operations of 1915 may be performed by a DMRS transmitting manager 1530 as described with reference to FIG. 15.

The following provides an overview of aspects of the present disclosure:

Aspect 1: A method for wireless communication at a UE, comprising: receiving first control signaling indicating a downlink control channel configuration associated with a first RAT, the downlink control channel configuration for a first set of time-frequency resources comprising one or more CCEs; receiving second control signaling indicating a CRS configuration associated with a second RAT, the CRS configuration for a second set of time-frequency resources that at least partially overlaps with at least one CCE of the one or more CCEs; and receiving a DMRS within a third set of time-frequency resources of a downlink control channel in accordance with a DMRS configuration that is identified for the third set of time-frequency resources based at least in part on the downlink control channel configuration and the CRS configuration, the third set of time-frequency resources included within the one or more CCEs of the first set of time-frequency resources exclusive of the second set of time-frequency resources.

Aspect 2: The method of aspect 1, wherein the one or more CCEs span at least a first symbol period and a second symbol period, the second set of time-frequency resources of the CRS configuration at least partially overlaps with a first portion of the one or more CCEs within the first symbol period, and the third set of time-frequency resources comprise a second portion of the one or more CCEs within the second symbol period.

Aspect 3: The method of aspect 2, wherein the third set of time-frequency resources includes each time-frequency resource of the one or more CCEs within the second symbol period and excludes each time-frequency resource of the one or more CCEs within the first symbol period based at least in part on the second set of time-frequency resources of the CRS configuration overlapping with at least a portion of at least one CCE within the first symbol period.

Aspect 4: The method of any of aspects 1 through 3, wherein the one or more CCEs comprise a first CCE and a second CCE that span at least a first symbol period and a second symbol period, the second set of time-frequency resources of the CRS configuration at least partially overlaps with a first portion of the first CCE in the first symbol period, and the third set of time-frequency resources comprise the second CCE and a second portion of the first CCE within the second symbol period.

Aspect 5: The method of any of aspects 1 through 4, wherein the one or more CCEs comprise a CCE including a first REG bundle and a second REG bundle that span at least a first symbol period and a second symbol period, the second set of time-frequency resources of the CRS configuration at least partially overlaps with a first portion of the first REG bundle in the first symbol period, and the third set of time-frequency resources comprise the second REG bundle and a second portion of the first REG bundle within the second symbol period.

Aspect 6: The method of aspect 5, wherein the second set of time-frequency resources of the CRS configuration overlaps with a first subset of the first portion of the first REG bundle in the first symbol period, and the third set of time-frequency resources further comprise a second subset of the first portion of the first REG bundle in the first symbol period.

Aspect 7: The method of any of aspects 1 through 6, further comprising: processing signals received within the one or more CCEs, wherein the one or more CCEs comprise a first set of CCEs of a first type and a second set of CCEs of a second type, wherein the first set of CCEs of the first type at least partially overlaps with the second set of time-frequency resources of the CRS configuration, and wherein the second set of CCEs of the second type does not overlap with the second set of time-frequency resources of the CRS configuration, wherein receiving the DMRS is based at least in part on the processing.

Aspect 8: The method of aspect 7, further comprising: processing the signals received within a quantity of CCEs of the one or more CCEs within a monitoring occasion, a slot, or both, wherein the quantity of CCEs is less than or equal to a threshold quantity of CCEs of the first type and the second type that are capable of being processed by the UE.

Aspect 9: The method of any of aspects 7 through 8, further comprising: processing the signals received within a first quantity of CCEs of the one or more CCEs within a monitoring occasion, a slot, or both, wherein the first quantity of CCEs is less than or equal to a first threshold quantity of CCEs of the first type that are capable of being processed by the UE; and processing the signals received within a second quantity of CCEs of the one or more CCEs within the monitoring occasion, the slot, or both, wherein the second quantity of CCEs is less than or equal to a second threshold quantity of CCEs of the second type that are capable of being processed by the UE.

Aspect 10: The method of any of aspects 1 through 9, further comprising: processing signals received within the one or more CCEs, wherein the one or more CCEs comprise a first set of CCEs of a first type, a second set of CCEs of a second type, and a third set of CCEs of a third type, wherein the first set of CCEs of the first type have a first level of overlap with the second set of time-frequency resources of the CRS configuration, wherein the second set of CCEs of the second type have a second level of overlap with the second set of time-frequency resources of the CRS configuration, and wherein the third set of CCEs of the third type do not overlap with the second set of time-frequency resources of the CRS configuration, wherein receiving the DMRS is based at least in part on the processing.

Aspect 11: The method of aspect 10, wherein processing the signals comprises: processing the signals received within a quantity of CCEs of the one or more CCEs within a monitoring occasion, a slot, or both, wherein the quantity of CCEs is less than or equal to a threshold quantity of CCEs of the first type, the second type, and the third type that are capable of being processed by the UE.

Aspect 12: The method of any of aspects 10 through 11, wherein processing the signals comprises: processing the signals received within a first quantity of CCEs of the one or more CCEs within a monitoring occasion, a slot, or both, wherein the first quantity of CCEs is less than or equal to a first threshold quantity of CCEs of the first type that are capable of being processed by the UE; processing the signals received within a second quantity of CCEs of the one or more CCEs within the monitoring occasion, the slot, or both, wherein the second quantity of CCEs is less than or equal to a second threshold quantity of CCEs of the second type that are capable of being processed by the UE; and processing the signals received within a third quantity of CCEs of the one or more CCEs within the monitoring occasion, the slot, or both, wherein the third quantity of CCEs is less than or equal to a third threshold quantity of CCEs of the third type that are capable of being processed by the UE.

Aspect 13: The method of any of aspects 10 through 12, wherein processing the signals comprises: processing the signals received within a first quantity of CCEs of the one or more CCEs within a monitoring occasion, a slot, or both, wherein the first quantity of CCEs is less than or equal to a first threshold quantity of CCEs of the first type and the second type that are capable of being processed by the UE; and processing the signals received within a second quantity of CCEs of the one or more CCEs within the monitoring occasion, the slot, or both, wherein the second quantity of CCEs is less than or equal to a second threshold quantity of CCEs of the second type that are capable of being processed by the UE.

Aspect 14: The method of any of aspects 1 through 13, further comprising: receiving a downlink control message within a portion of the first set of time-frequency resources exclusive of the second set of time-frequency resources and the third set of time-frequency resources.

Aspect 15: The method of any of aspects 1 through 14, wherein the first RAT comprises a 5G RAT, an NR access technology, or any combination thereof, and the second RAT comprises a 4G RAT, an LTE RAT, or any combination thereof.

Aspect 16: A method for wireless communication at a UE, comprising: transmitting, to a UE, first control signaling indicating a downlink control channel configuration associated with a first RAT, the downlink control channel configuration for a first set of time-frequency resources comprising one or more CCEs; transmitting, to the UE, second control signaling indicating a CRS configuration associated with a second RAT, the CRS configuration for a second set of time-frequency resources that at least partially overlaps with at least one CCE of the one or more CCEs; and transmitting, to the UE, a DMRS within a third set of time-frequency resources of a downlink control channel in accordance with a DMRS configuration that is identified for the third set of time-frequency resources based at least in part on the downlink control channel configuration and the CRS configuration, the third set of time-frequency resources included within the one or more CCEs of the first set of time-frequency resources exclusive of the second set of time-frequency resources.

Aspect 17: The method of aspect 16, wherein the one or more CCEs span at least a first symbol period and a second symbol period, the second set of time-frequency resources of the CRS configuration at least partially overlaps with a first portion of the one or more CCEs within the first symbol period, and the third set of time-frequency resources comprise a second portion of the one or more CCEs within the second symbol period.

Aspect 18: The method of aspect 17, wherein the third set of time-frequency resources includes each time-frequency resource of the one or more CCEs within the second symbol period and excludes each time-frequency resource of the one or more CCEs within the first symbol period based at least in part on the second set of time-frequency resources of the CRS configuration overlapping with at least a portion of at least one CCE within the first symbol period.

Aspect 19: The method of any of aspects 16 through 18, wherein the one or more CCEs comprise a first CCE and a second CCE that span at least a first symbol period and a second symbol period, the second set of time-frequency resources of the CRS configuration at least partially overlaps with a first portion of the first CCE in the first symbol period, and the third set of time-frequency resources comprise the second CCE and a second portion of the first CCE within the second symbol period.

Aspect 20: The method of any of aspects 16 through 19, wherein the one or more CCEs comprise a CCE including a first REG bundle and a second REG bundle that span at least a first symbol period and a second symbol period, the second set of time-frequency resources of the CRS configuration at least partially overlaps with a first portion of the first REG bundle in the first symbol period, and the third set of time-frequency resources comprise the second REG bundle and a second portion of the first REG bundle within the second symbol period.

Aspect 21: The method of aspect 20, wherein the second set of time-frequency resources of the CRS configuration overlaps with a first subset of the first portion of the first REG bundle in the first symbol period, and the third set of time-frequency resources further comprise a second subset of the first portion of the first REG bundle in the first symbol period.

Aspect 22: The method of any of aspects 16 through 21, further comprising: transmitting a downlink control message to the UE within a portion of the first set of time-frequency resources exclusive of the second set of time-frequency resources and the third set of time-frequency resources.

Aspect 23: An apparatus for wireless communication at a UE, comprising a processor; memory coupled with the processor; and instructions stored in the memory and executable by the processor to cause the apparatus to perform a method of any of aspects 1 through 15.

Aspect 24: An apparatus for wireless communication at a UE, comprising at least one means for performing a method of any of aspects 1 through 15.

Aspect 25: A non-transitory computer-readable medium storing code for wireless communication at a UE, the code comprising instructions executable by a processor to perform a method of any of aspects 1 through 15.

Aspect 26: An apparatus for wireless communication at a UE, comprising a processor; memory coupled with the processor; and instructions stored in the memory and executable by the processor to cause the apparatus to perform a method of any of aspects 16 through 22.

Aspect 27: An apparatus for wireless communication at a UE, comprising at least one means for performing a method of any of aspects 16 through 22.

Aspect 28: A non-transitory computer-readable medium storing code for wireless communication at a UE, the code comprising instructions executable by a processor to perform a method of any of aspects 16 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
- at least one processor;
- at least one memory coupled with the at least one processor; and
- instructions stored in the at least one memory and executable by the at least one processor to cause the apparatus to:
  - receive first control signaling indicating a downlink control channel configuration associated with a first radio access technology, the downlink control channel configuration for a first set of time-frequency resources comprising one or more control channel elements;
  - receive second control signaling indicating a cell-specific reference signal configuration associated with a second radio access technology, the cell-specific reference signal configuration for a second set of time-frequency resources that at least partially overlaps with at least one control channel element of the one or more control channel elements, wherein the second set of time-frequency resources of the cell-specific reference signal configuration overlaps with a first subset of a first portion of a first resource element group bundle in a first symbol period; and receive a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources, and the third set of time-frequency resources further comprises a second subset of the first portion of the first resource element group bundle in the first symbol period.

2. The apparatus of claim 1, wherein the one or more control channel elements span at least the first symbol period and a second symbol period, wherein the second set of time-frequency resources of the cell-specific reference signal configuration at least partially overlaps with a first portion of the one or more control channel elements within the first symbol period, and wherein the third set of time-frequency resources comprise a second portion of the one or more control channel elements within the second symbol period.

3. The apparatus of claim 2, wherein the third set of time-frequency resources includes each time-frequency resource of the one or more control channel elements within the second symbol period.

4. The apparatus of claim 1, wherein the one or more control channel elements comprise a control channel element including the first resource element group bundle and a second resource element group bundle that span at least the first symbol period and a second symbol period, wherein the third set of time-frequency resources comprises the second resource element group bundle and a second portion of the first resource element group bundle within the second symbol period.

5. The apparatus of claim 1, wherein the instructions are further executable by the at least one processor to cause the apparatus to:

process signals received within the one or more control channel elements, wherein the one or more control channel elements comprise a first set of control channel elements of a first type and a second set of control channel elements of a second type, wherein the first set of control channel elements of the first type at least partially overlaps with the second set of time-frequency resources of the cell-specific reference signal configuration, and wherein the second set of control channel elements of the second type does not overlap with the second set of time-frequency resources of the cell-specific reference signal configuration, wherein receiving the demodulation reference signal is based at least in part on the processing.

6. The apparatus of claim 5, wherein the instructions are further executable by the at least one processor to cause the apparatus to:

process the signals received within a quantity of control channel elements of the one or more control channel elements within a monitoring occasion, a slot, or both, wherein the quantity of control channel elements is less than or equal to a threshold quantity of control channel elements of the first type and the second type that are capable of being processed by the UE.

7. The apparatus of claim 5, wherein the instructions are further executable by the at least one processor to cause the apparatus to:

process the signals received within a first quantity of control channel elements of the one or more control channel elements within a monitoring occasion, a slot, or both, wherein the first quantity of control channel elements is less than or equal to a first threshold quantity of control channel elements of the first type that are capable of being processed by the UE; and process the signals received within a second quantity of control channel elements of the one or more control channel elements within the monitoring occasion, the slot, or both, wherein the second quantity of control channel elements is less than or equal to a second threshold quantity of control channel elements of the second type that are capable of being processed by the UE.

8. The apparatus of claim 1, wherein the instructions are further executable by the at least one processor to cause the apparatus to:

process signals received within the one or more control channel elements, wherein the one or more control channel elements comprise a first set of control channel elements of a first type, a second set of control channel elements of a second type, and a third set of control channel elements of a third type, wherein the first set of control channel elements of the first type have a first level of overlap with the second set of time-frequency resources of the cell-specific reference signal configuration, wherein the second set of control channel elements of the second type have a second level of overlap with the second set of time-frequency resources of the cell-specific reference signal configuration, and wherein the third set of control channel elements of the third type do not overlap with the second set of time-frequency resources of the cell-specific reference signal configuration, wherein receiving the demodulation reference signal is based at least in part on the processing.

9. The apparatus of claim 8, wherein the instructions to process the signals are executable by the at least one processor to cause the apparatus to:

process the signals received within a quantity of control channel elements of the one or more control channel elements within a monitoring occasion, a slot, or both, wherein the quantity of control channel elements is less than or equal to a threshold quantity of control channel elements of the first type, the second type, and the third type that are capable of being processed by the UE.

10. The apparatus of claim 8, wherein the instructions to process the signals are executable by the at least one processor to cause the apparatus to:

process the signals received within a first quantity of control channel elements of the one or more control channel elements within a monitoring occasion, a slot, or both, wherein the first quantity of control channel elements is less than or equal to a first threshold quantity of control channel elements of the first type that are capable of being processed by the UE;

process the signals received within a second quantity of control channel elements of the one or more control channel elements within the monitoring occasion, the slot, or both, wherein the second quantity of control channel elements is less than or equal to a second threshold quantity of control channel elements of the second type that are capable of being processed by the UE; and process the signals received within a third quantity of control channel elements of the one or more control channel elements within the monitoring occasion, the slot, or both, wherein the third quantity of control channel elements is less than or equal to a third threshold quantity of control channel elements of the third type that are capable of being processed by the UE.

11. The apparatus of claim 8, wherein the instructions to process the signals are executable by the at least one processor to cause the apparatus to:

process the signals received within a first quantity of control channel elements of the one or more control channel elements within a monitoring occasion, a slot, or both, wherein the first quantity of control channel elements is less than or equal to a first threshold quantity of control channel elements of the first type and the second type that are capable of being processed by the UE; and process the signals received within a second quantity of control channel elements of the one or more control channel elements within the monitoring occasion, the slot, or both, wherein the second quantity of control channel elements is less than or equal to a second threshold quantity of control channel elements of the second type that are capable of being processed by the UE.

12. The apparatus of claim 1, wherein the instructions are further executable by the at least one processor to cause the apparatus to:

receive a downlink control message within a portion of the first set of time-frequency resources exclusive of the second set of time-frequency resources and the third set of time-frequency resources.

13. The apparatus of claim 1, wherein the first radio access technology comprises a Fifth Generation radio access technology, a New Radio access technology, or any combination thereof, and wherein the second radio access technology comprises a Fourth Generation radio access technology, a Long Term Evolution radio access technology, or any combination thereof.

14. An apparatus for wireless communication at a network entity, comprising:

at least one processor;

at least one memory coupled with the at least one processor; and instructions stored in the at least one memory and executable by the at least one processor to cause the apparatus to:

transmit, to a user equipment (UE), first control signaling indicating a downlink control channel configuration associated with a first radio access technology, the downlink control channel configuration for a first set of time-frequency resources comprising one or more control channel elements;

transmit, to the UE, second control signaling indicating a cell-specific reference signal configuration associated with a second radio access technology, the cell-specific reference signal configuration for a second set of time-frequency resources that at least partially overlaps with at least one control channel element of the one or more control channel elements, wherein the second set of time-frequency resources of the cell-specific reference signal configuration overlaps with a first subset of a first portion of a first resource element group bundle in a first symbol period; and transmit, to the UE, a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources, and the third set of time-frequency resources further comprises a second subset of the first portion of the first resource element group bundle in the first symbol period.

15. The apparatus of claim 14, wherein the one or more control channel elements span at least the first symbol period and a second symbol period, wherein the second set of time-frequency resources of the cell-specific reference signal configuration at least partially overlaps with a first portion of the one or more control channel elements within the first symbol period, and wherein the third set of time-frequency resources comprise a second portion of the one or more control channel elements within the second symbol period.

16. The apparatus of claim 15, wherein the third set of time-frequency resources includes each time-frequency resource of the one or more control channel elements within the second symbol period.

17. The apparatus of claim 14, wherein the one or more control channel elements comprise a control channel element including the first resource element group bundle and a second resource element group bundle that span at least the first symbol period and a second symbol period, wherein the third set of time-frequency resources comprise the second resource element group bundle and a second portion of the first resource element group bundle within the second symbol period.

18. The apparatus of claim 14, wherein the instructions are further executable by the at least one processor to cause the apparatus to:

transmit a downlink control message to the UE within a portion of the first set of time-frequency resources exclusive of the second set of time-frequency resources and the third set of time-frequency resources.

19. A method for wireless communication at a user equipment (UE), comprising:

receiving first control signaling indicating a downlink control channel configuration associated with a first radio access technology, the downlink control channel configuration for a first set of time-frequency resources comprising one or more control channel elements;

receiving second control signaling indicating a cell-specific reference signal configuration associated with a second radio access technology, the cell-specific reference signal configuration for a second set of time-frequency resources that at least partially overlaps with at least one control channel element of the one or more control channel elements, wherein the second set of time-frequency resources of the cell-specific reference signal configuration overlaps with a first subset of a first portion of a first resource element group bundle in a first symbol period; and receiving a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources, and the third set of time-frequency resources further comprises a second subset of the first portion of the first resource element group bundle in the first symbol period.

20. The method of claim 19, wherein the one or more control channel elements span at least the first symbol period and a second symbol period, wherein the second set of time-frequency resources of the cell-specific reference signal configuration at least partially overlaps with a first portion of the one or more control channel elements within the first symbol period, and wherein the third set of time-frequency resources comprise a second portion of the one or more control channel elements within the second symbol period.

21. The method of claim 20, wherein the third set of time-frequency resources includes each time-frequency resource of the one or more control channel elements within the second symbol period.

22. The method of claim 19, wherein the one or more control channel elements comprise a control channel element including the first resource element group bundle and a second resource element group bundle that span at least the first symbol period and a second symbol period, wherein the third set of time-frequency resources comprise the second resource element group bundle and a second portion of the first resource element group bundle within the second symbol period.

23. The method of claim 19, further comprising:

processing signals received within the one or more control channel elements, wherein the one or more control channel elements comprise a first set of control channel elements of a first type and a second set of control channel elements of a second type, wherein the first set of control channel elements of the first type at least partially overlaps with the second set of time-frequency resources of the cell-specific reference signal configuration, and wherein the second set of control channel elements of the second type does not overlap with the second set of time-frequency resources of the cell-specific reference signal configuration, wherein receiving the demodulation reference signal is based at least in part on the processing.

24. A method for wireless communication at a network entity, comprising:

transmitting, to a user equipment (UE), first control signaling indicating a downlink control channel configuration associated with a first radio access technology, the downlink control channel configuration for a first set of time-frequency resources comprising one or more control channel elements;

transmitting, to the UE, second control signaling indicating a cell-specific reference signal configuration associated with a second radio access technology, the cell-specific reference signal configuration for a second set of time-frequency resources that at least partially overlaps with at least one control channel element of the one or more control channel elements, wherein the second set of time-frequency resources of the cell-specific reference signal configuration overlaps with a first subset of a first portion of a first resource element group bundle in a first symbol period; and transmitting, to the UE, a demodulation reference signal within a third set of time-frequency resources of a downlink control channel in accordance with a demodulation reference signal configuration that is identified for the third set of time-frequency resources based at least in part on the downlink control channel configuration and the cell-specific reference signal configuration, the third set of time-frequency resources included within the one or more control channel elements of the first set of time-frequency resources exclusive of the second set of time-frequency resources, and the third set of time-frequency resources further comprises a second subset of the first portion of the first resource element group bundle in the first symbol period.

* * * * *